United States Patent
Kono

(10) Patent No.: US 8,834,008 B2
(45) Date of Patent: Sep. 16, 2014

(54) DISPLAY MODULE, DISPLAY DEVICE, AND LIQUID CRYSTAL TELEVISION SET

(75) Inventor: Akifumi Kono, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 236 days.

(21) Appl. No.: 13/427,632

(22) Filed: Mar. 22, 2012

(65) Prior Publication Data

US 2012/0249892 A1 Oct. 4, 2012

(30) Foreign Application Priority Data

Mar. 29, 2011 (JP) .................... 2011-72750

(51) Int. Cl.
*F21V 7/04* (2006.01)
*F21V 8/00* (2006.01)
*G06F 1/16* (2006.01)
*H04N 5/65* (2006.01)

(52) U.S. Cl.
CPC ............... *H04N 5/65* (2013.01); *G02B 6/0088* (2013.01); *G06F 1/1601* (2013.01)
USPC ......................................... 362/634; 362/97.1

(58) Field of Classification Search
CPC ....... G06F 1/1601; G02B 6/0088; H04N 5/65
USPC ............... 362/634, 97.1, 632, 633, 97.2, 602, 362/628; 348/794, E05.128
See application file for complete search history.

(56) References Cited

U.S. PATENT DOCUMENTS

| 7,697,090 B2 | 4/2010 | Shimizu | |
|---|---|---|---|
| 2009/0097277 A1* | 4/2009 | Iwasaki | 362/628 |
| 2010/0149440 A1* | 6/2010 | Yokawa | 348/836 |
| 2011/0181809 A1* | 7/2011 | Sekiguchi et al. | 349/62 |

FOREIGN PATENT DOCUMENTS

| JP | 2008-27736 A | 2/2008 |
|---|---|---|
| JP | 2008-159452 A | 7/2008 |
| JP | 2008-305576 A | 12/2008 |
| JP | 2011-33742 A | 2/2011 |

* cited by examiner

*Primary Examiner* — Nimeshkumar Patel
*Assistant Examiner* — Glenn Zimmerman
(74) *Attorney, Agent, or Firm* — Crowell & Moring LLP

(57) ABSTRACT

This display module includes a display cell, a board, a light guide plate formed with a first engaging portion, and a holding member formed with a second engaging portion coming into contact with the first engaging portion to engage with the first engaging portion. At least either the first engaging portion or the second engaging portion is formed in a shape allowing the light guide plate to move in a direction orthogonal to the board in response to expansion or contraction of the light guide plate when the light guide plate expands or contracts.

12 Claims, 10 Drawing Sheets

FIRST EMBODIMENT

DISPLAY MODULE, DISPLAY DEVICE, AND LIQUID CRYSTAL TELEVISION SET

BACKGROUND OF THE INVENTION

1. Field of the Invention

The present invention relates to a display module, a display device, and a liquid crystal television set, and more particularly, it relates to a display module, a display device, and a liquid crystal television set each including a light guide plate guiding light received from a light source to a display cell and a holding member holding the light guide plate.

2. Description of the Background Art

A display module including a light guide plate guiding light received from a light source to a display cell and a holding member holding the light guide plate is known in general, as disclosed in Japanese Patent Laying-Open No. 2008-305576, for example.

The aforementioned Japanese Patent Laying-Open No. 2008-305576 discloses a liquid crystal display device including a rectangular light guide plate guiding light received from a cold-cathode tube (light source) to a liquid crystal display panel (display cell) and a frame (holding member) holding the light guide plate. In this liquid crystal display device, the light guide plate is provided in the form of a flat plate, and rectangular recess portions are formed on a first end surface of the light guide plate and a second end surface thereof opposed to the first end surface. Furthermore, in this liquid crystal display device, the frame is so formed as to surround respective end surfaces of the light guide plate in the form of a flat plate, and rectangular projecting portions are formed on portions of the frame corresponding to the recess portions of the light guide plate. In this liquid crystal display device, the recess portions of the light guide plate and the projecting portions of the frame are engaged with each other, whereby the light guide plate is held by the frame in the state where the light guide plate and the frame are in contact with each other. In this liquid crystal display device, the cold-cathode tube is opposed to an end surface on which no recess portion of the light guide plate is provided.

In the liquid crystal display device according to the aforementioned Japanese Patent Laying-Open No. 2008-305576, however, the light guide plate may expand or contract by heat generated from the cold-cathode tube (light source) or changes in temperature conditions and humidity conditions where the liquid crystal display device is placed. In this case, the light guide plate expands/contracts on the side of the light guide plate closer to the cold-cathode tube, employing portions of the light guide plate engaging with the holding member as basic points, and hence a distance (clearance) between the end surface of the light guide plate closer to the cold-cathode tube and the cold-cathode tube is changed. When the clearance between the cold-cathode tube (light source) and the light guide plate is changed, the light incidence efficiency with respect to the light guide plate is changed. Thus, the optical characteristics of backlight emitted from the light guide plate disadvantageously become unstable.

SUMMARY OF THE INVENTION

The present invention has been proposed in order to solve the aforementioned problem, and an object of the present invention is to provide a display module, a display device, and a liquid crystal television set each capable of stabilizing the optical characteristics of backlight by reducing the amount of change in a clearance between a light source and a light guide plate.

A display module according to a first aspect of the present invention includes a display cell, a board including a mounting surface mounted with a light source, a light guide plate formed with a first engaging portion, guiding light received from the light source to the display cell, and a holding member formed with a second engaging portion coming into contact with the first engaging portion of the light guide plate to engage with the first engaging portion, holding the board and the light guide plate, while at least either the first engaging portion of the light guide plate or the second engaging portion of the holding member is formed in a shape allowing the first engaging portion of the light guide plate to move in a direction orthogonal to the mounting surface of the board in response to expansion or contraction of the light guide plate when the light guide plate expands or contracts.

In the display module according to the first aspect of the present invention, as hereinabove described, at least either the first engaging portion of the light guide plate or the second engaging portion of the holding member is formed in the shape allowing the first engaging portion of the light guide plate to move in the direction orthogonal to the mounting surface of the board in response to the expansion or contraction of the light guide plate when the light guide plate expands or contracts. Thus, the light guide plate can move in the direction orthogonal to the mounting surface of the board to cancel a change in a distance (clearance) between the light source and the light guide plate even when the distance is changed by the expansion or contraction of the light guide plate due to heat or the like generated from the light source, and hence the amount of change in the clearance between the light source and the light guide plate can be reduced. Consequently, the optical characteristics of backlight emitted from the light guide plate can be stabilized.

In the aforementioned display module according to the first aspect, at least either the first engaging portion of the light guide plate or the second engaging portion of the holding member is preferably formed in a shape allowing the first engaging portion of the light guide plate to move in a direction separating from the mounting surface of the board in response to the expansion of the light guide plate when the light guide plate expands and allowing the first engaging portion of the light guide plate to move in a direction approaching the mounting surface of the board in response to the contraction of the light guide plate when the light guide plate contracts. According to this structure, the light guide plate can move in the direction separating from the mounting surface (light source) of the board in response to the expansion of the light guide plate when the clearance between the light source and the light guide plate is reduced by the expansion of the light guide plate, whereas the light guide plate can move in the direction approaching the mounting surface (light source) of the board in response to the contraction of the light guide plate when the clearance between the light source and the light guide plate is increased by the contraction of the light guide plate. Thus, the amount of change in the clearance between the light source and the light guide plate can be easily reduced, and hence the optical characteristics of the backlight emitted from the light guide plate can be easily stabilized.

In the aforementioned display module according to the first aspect, the light guide plate is preferably arranged above the mounting surface of the board, and at least one of a portion of the first engaging portion of the light guide plate and a portion of the second engaging portion of the holding member, coming into contact with each other due to a weight of the light guide plate when the first engaging portion and the second engaging portion engage with each other preferably includes a portion in a shape allowing the first engaging portion of the light guide plate to move upward or downward above the mounting surface of the board in response to the expansion or contraction of the light guide plate when the light guide plate expands or contracts. Although it is necessary to press the light guide plate toward the light source in order to keep the clearance between the light source and the light guide plate substantially constant in a state where the light guide plate neither expands nor contrasts, the light guide plate can be easily pressed toward the light source employing the weight of the light guide plate according to the present invention. In other words, no urging member or the like to press the light guide plate toward the light source may be provided separately, and hence the clearance between the light source and the light guide plate can be kept substantially constant employing the simple structure in the state where the light guide plate neither expands nor contracts.

In the aforementioned display module according to the first aspect, the first engaging portion of the light guide plate and the second engaging portion of the holding member preferably include arcuate portions engaging with each other and coming into contact with each other in a state where the light guide plate expands or contracts, and a radius of curvature of the arcuate portion of the first engaging portion of the light guide plate is preferably larger than a radius of curvature of the arcuate portion of the second engaging portion of the holding member. According to this structure, the arcuate portion of the first engaging portion of the light guide plate can move along the arcuate portion of the second engaging portion of the holding member in the state where the light guide plate expands or contracts, and hence the first engaging portion of the light guide plate can easily move in the direction separating from or the direction approaching the mounting surface of the board.

In this case, the first engaging portion of the light guide plate and the second engaging portion of the holding member preferably further include first parallel portions extending in a direction parallel to the mounting surface of the board, engaging with each other and coming into contact with each other in a state where the light guide plate neither expands nor contracts in addition to the arcuate portions. According to this structure, the light guide plate can be stably held by the holding member with the first parallel portions extending in the direction parallel to the mounting surface of the board that the first engaging portion of the light guide plate and the second engaging portion of the holding member have in the state where the light guide plate and the holding member are in contact with each other, when the light guide plate neither expands nor contracts.

In the aforementioned display module according to the first aspect, at least either one of the first engaging portion and the second engaging portion preferably includes an inclined portion inclined by a prescribed angle θ with respect to the mounting surface of the board in a direction separating from the mounting surface, engaging with the other one of the first engaging portion and the second engaging portion and coming into contact with the other one of the first engaging portion and the second engaging portion in a state where the light guide plate expands or contracts. According to this structure, the first engaging portion can move along the inclined portion that at least either one of the first engaging portion and the second engaging portion has in the state where the light guide plate expands or contracts, and hence the first engaging portion of the light guide plate can easily move in the direction separating from or the direction approaching the mounting surface of the board.

In this case, the first engaging portion and the second engaging portion preferably further include second parallel portions extending in a direction parallel to the mounting surface of the board, engaging with each other and coming into contact with each other in a state where the light guide plate neither expands nor contracts. According to this structure, the light guide plate can be stably held by the holding member with the second parallel portions extending in the direction parallel to the mounting surface of the board that the first engaging portion of the light guide plate and the second engaging portion of the holding member have in the state where the light guide plate and the holding member are in contact with each other, when the light guide plate neither expands nor contracts.

In the aforementioned display module in which at least either one of the first engaging portion and the second engaging portion includes the inclined portion inclined by the prescribed angle θ with respect to the mounting surface of the board, the light guide plate preferably includes a first end surface parallel to the mounting surface of the board and a second end surface formed with the first engaging portion, perpendicular to the mounting surface of the board, and the prescribed angle θ is preferably so set as to be equal to arctan (H/L), where L denotes a length of the first end surface of the light guide plate in a longitudinal direction and H denotes a distance from the first end surface to the first engaging portion formed on the second end surface of the light guide plate. The prescribed angle θ is set in this manner, whereby the first engaging portion moves along the inclined portion that at least either one of the first engaging portion and the second engaging portion has in the state where the light guide plate expands or contracts so that the clearance between the light source and the light guide plate can be kept substantially constant.

In the aforementioned display module according to the first aspect, each of the light guide plate and the holding member preferably has a rectangular shape, and the first engaging portion is preferably formed on each of two sides of the light guide plate having a rectangular shape, extending in the direction orthogonal to the mounting surface of the board while the second engaging portion is formed on each of two sides of the holding member having a rectangular shape, extending in the direction orthogonal to the mounting surface of the board. According to this structure, the light guide plate moving in the direction orthogonal to the mounting surface of the board can be stably supported by the first engaging portion and the second engaging portion formed on the two sides of the light guide plate and the holding member each having a rectangular shape, extending in the direction orthogonal to the mounting surface of the board.

In the aforementioned display module according to the first aspect, the first engaging portion preferably includes either one of a recess portion and a projecting portion, and the second engaging portion preferably includes the other one of the recess portion and the projecting portion coming into contact with the first engaging portion to engage with the first engaging portion. According to this structure, the amount of change in the clearance between the light source and the light guide plate can be easily reduced by the first engaging portion and the second engaging portion each having the simple structure.

A display device according to a second aspect of the present invention includes a display module and a housing storing the display module inside, while the display module includes a display cell, a board having a mounting surface mounted with a light source, a light guide plate formed with a first engaging portion, guiding light received from the light source to the display cell, and a holding member formed with a second engaging portion coming into contact with the first engaging portion of the light guide plate to engage with the first engaging portion, holding the board and the light guide plate, and at least either the first engaging portion of the light guide plate or the second engaging portion of the holding member is formed in a shape allowing the first engaging portion of the light guide plate to move in a direction orthogonal to the mounting surface of the board in response to expansion or contraction of the light guide plate when the light guide plate expands or contracts.

In the display device according to the second aspect of the present invention, as hereinabove described, at least either the first engaging portion of the light guide plate or the second engaging portion of the holding member of the display module is formed in the shape allowing the first engaging portion of the light guide plate to move in the direction orthogonal to the mounting surface of the board in response to the expansion or contraction of the light guide plate when the light guide plate expands or contracts. Thus, the light guide plate can move in the direction orthogonal to the mounting surface of the board to cancel a change in a distance (clearance) between the light source and the light guide plate even when the distance is changed by the expansion or contraction of the light guide plate due to heat or the like generated from the light source, and hence the amount of change in the clearance between the light source and the light guide plate can be reduced. Consequently, the display device capable of stabilizing the optical characteristics of backlight emitted from the light guide plate can be provided.

In the aforementioned display device according to the second aspect, at least either the first engaging portion of the light guide plate or the second engaging portion of the holding member is preferably formed in a shape allowing the first engaging portion of the light guide plate to move in a direction separating from the mounting surface of the board in response to the expansion of the light guide plate when the light guide plate expands and allowing the first engaging portion of the light guide plate to move in a direction approaching the mounting surface of the board in response to the contraction of the light guide plate when the light guide plate contracts. According to this structure, the light guide plate can move in the direction separating from the mounting surface (light source) of the board in response to the expansion of the light guide plate when the clearance between the light source and the light guide plate is reduced by the expansion of the light guide plate, whereas the light guide plate can move in the direction approaching the mounting surface (light source) of the board in response to the contraction of the light guide plate when the clearance between the light source and the light guide plate is increased by the contraction of the light guide plate. Thus, the amount of change in the clearance between the light source and the light guide plate can be easily reduced, and hence the optical characteristics of the backlight emitted from the light guide plate can be easily stabilized.

In the aforementioned display device according to the second aspect, the light guide plate is preferably arranged above the mounting surface of the board, and at least one of a portion of the first engaging portion of the light guide plate and a portion of the second engaging portion of the holding member, coming into contact with each other due to a weight of the light guide plate when the first engaging portion and the second engaging portion engage with each other preferably includes a portion in a shape allowing the first engaging portion of the light guide plate to move upward or downward above the mounting surface of the board in response to the expansion or contraction of the light guide plate when the light guide plate expands or contracts. Although it is necessary to press the light guide plate toward the light source in order to keep the clearance between the light source and the light guide plate substantially constant in a state where the light guide plate neither expands nor contrasts, the light guide plate can be easily pressed toward the light source employing the weight of the light guide plate according to the present invention. In other words, no urging member or the like to press the light guide plate toward the light source may be provided separately, and hence the clearance between the light source and the light guide plate can be kept substantially constant employing the simple structure in the state where the light guide plate neither expands nor contracts.

In the aforementioned display device according to the second aspect, the first engaging portion of the light guide plate and the second engaging portion of the holding member preferably include arcuate portions engaging with each other and coming into contact with each other in a state where the light guide plate expands or contracts, and a radius of curvature of the arcuate portion of the first engaging portion of the light guide plate is preferably larger than a radius of curvature of the arcuate portion of the second engaging portion of the holding member. According to this structure, the arcuate portion of the first engaging portion of the light guide plate can move along the arcuate portion of the second engaging portion of the holding member in the state where the light guide plate expands or contracts, and hence the first engaging portion of the light guide plate can easily move in the direction separating from or the direction approaching the mounting surface of the board.

In this case, the first engaging portion of the light guide plate and the second engaging portion of the holding member preferably further include first parallel portions extending in a direction parallel to the mounting surface of the board, engaging with each other and coming into contact with each other in a state where the light guide plate neither expands nor contracts in addition to the arcuate portions. According to this structure, the light guide plate can be stably held by the holding member with the first parallel portions extending in the direction parallel to the mounting surface of the board that the first engaging portion of the light guide plate and the second engaging portion of the holding member have in the state where the light guide plate and the holding member are in contact with each other, when the light guide plate neither expands nor contracts.

In the aforementioned display device according to the second aspect, at least either one of the first engaging portion and the second engaging portion preferably includes an inclined portion inclined by a prescribed angle θ with respect to the mounting surface of the board in a direction separating from the mounting surface, engaging with the other one of the first engaging portion and the second engaging portion and coming into contact with the other one of the first engaging portion and the second engaging portion in a state where the light guide plate expands or contracts. According to this structure, the first engaging portion can move along the inclined portion that at least either one of the first engaging portion and the second engaging portion has in the state where the light guide plate expands or contracts, and hence the first engaging portion of the light guide plate can easily move in the direction separating from or the direction approaching the mounting surface of the board.

In this case, the first engaging portion and the second engaging portion preferably further include second parallel portions extending in a direction parallel to the mounting surface of the board, engaging with each other and coming into contact with each other in a state where the light guide plate neither expands nor contracts. According to this structure, the light guide plate can be stably held by the holding member with the second parallel portions extending in the direction parallel to the mounting surface of the board that the first engaging portion of the light guide plate and the second engaging portion of the holding member have in the state where the light guide plate and the holding member are in contact with each other, when the light guide plate neither expands nor contracts.

In the aforementioned display device in which at least either one of the first engaging portion and the second engaging portion includes the inclined portion inclined by the prescribed angle θ with respect to the mounting surface of the board, the light guide plate preferably includes a first end surface parallel to the mounting surface of the board and a second end surface formed with the first engaging portion, perpendicular to the mounting surface of the board, and the prescribed angle θ is preferably so set as to be equal to arctan (H/L), where L denotes a length of the first end surface of the light guide plate in a longitudinal direction and H denotes a distance from the first end surface to the first engaging portion formed on the second end surface of the light guide plate. The prescribed angle θ is set in this manner, whereby the first engaging portion moves along the inclined portion that at least either one of the first engaging portion and the second engaging portion has in the state where the light guide plate expands or contracts so that the clearance between the light source and the light guide plate can be kept substantially constant.

In the aforementioned display device according to the second aspect, each of the light guide plate and the holding member preferably has a rectangular shape, and the first engaging portion is preferably formed on each of two sides of the light guide plate having a rectangular shape, extending in the direction orthogonal to the mounting surface of the board while the second engaging portion is formed on each of two sides of the holding member having a rectangular shape, extending in the direction orthogonal to the mounting surface of the board. According to this structure, the light guide plate moving in the direction orthogonal to the mounting surface of the board can be stably supported by the first engaging portion and the second engaging portion formed on the two sides of the light guide plate and the holding member each having a rectangular shape, extending in the direction orthogonal to the mounting surface of the board.

A liquid crystal television set according to a third aspect of the present invention includes a liquid crystal display module, and a television housing storing the liquid crystal display module inside, while the liquid crystal display module includes a liquid crystal display cell, a board having a mounting surface mounted with a light source, a light guide plate formed with a first engaging portion, guiding light received from the light source to the liquid crystal display cell, and a holding member formed with a second engaging portion coming into contact with the first engaging portion of the light guide plate to engage with the first engaging portion, holding the board and the light guide plate, and at least either the first engaging portion of the light guide plate or the second engaging portion of the holding member is formed in a shape allowing the first engaging portion of the light guide plate to move in a direction orthogonal to the mounting surface of the board in response to expansion or contraction of the light guide plate when the light guide plate expands or contracts.

In the liquid crystal television set according to the third aspect of the present invention, as hereinabove described, at least either the first engaging portion of the light guide plate or the second engaging portion of the holding member of the liquid crystal display module is formed in the shape allowing the first engaging portion of the light guide plate to move in the direction orthogonal to the mounting surface of the board in response to the expansion or contraction of the light guide plate when the light guide plate expands or contracts. Thus, the light guide plate can move in the direction orthogonal to the mounting surface of the board to cancel a change in a distance (clearance) between the light source and the light guide plate even when the distance is changed by the expansion or contraction of the light guide plate due to heat or the like generated from the light source, and hence the amount of change in the clearance between the light source and the light guide plate can be reduced. Consequently, the liquid crystal television set capable of stabilizing the optical characteristics of backlight emitted from the light guide plate can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

First, the structure of a liquid crystal television 100 according to a first embodiment of the present invention is described with reference to FIGS. 1 to 7. The liquid crystal television 100 is an example of the "display device" or the "liquid crystal television set" in the present invention.

Figure 1:
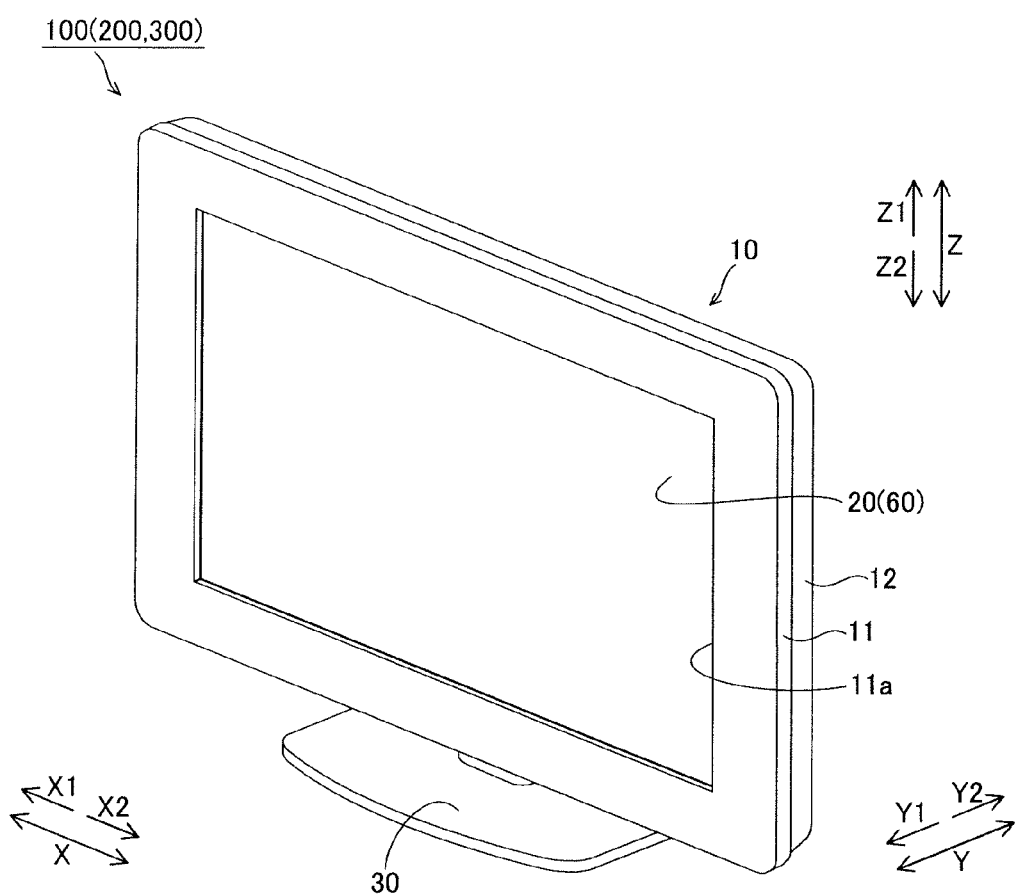
FIG. 1 is a perspective view showing the overall structure of a liquid crystal television according to each of first to third embodiments of the present invention.

The liquid crystal television 100 according to the first embodiment of the present invention includes a television body 10 having a display portion 20 displaying an image and a stand member 30 supporting the television body 10 from below (along arrow Z1), as shown in FIG. 1.

Figure 2:
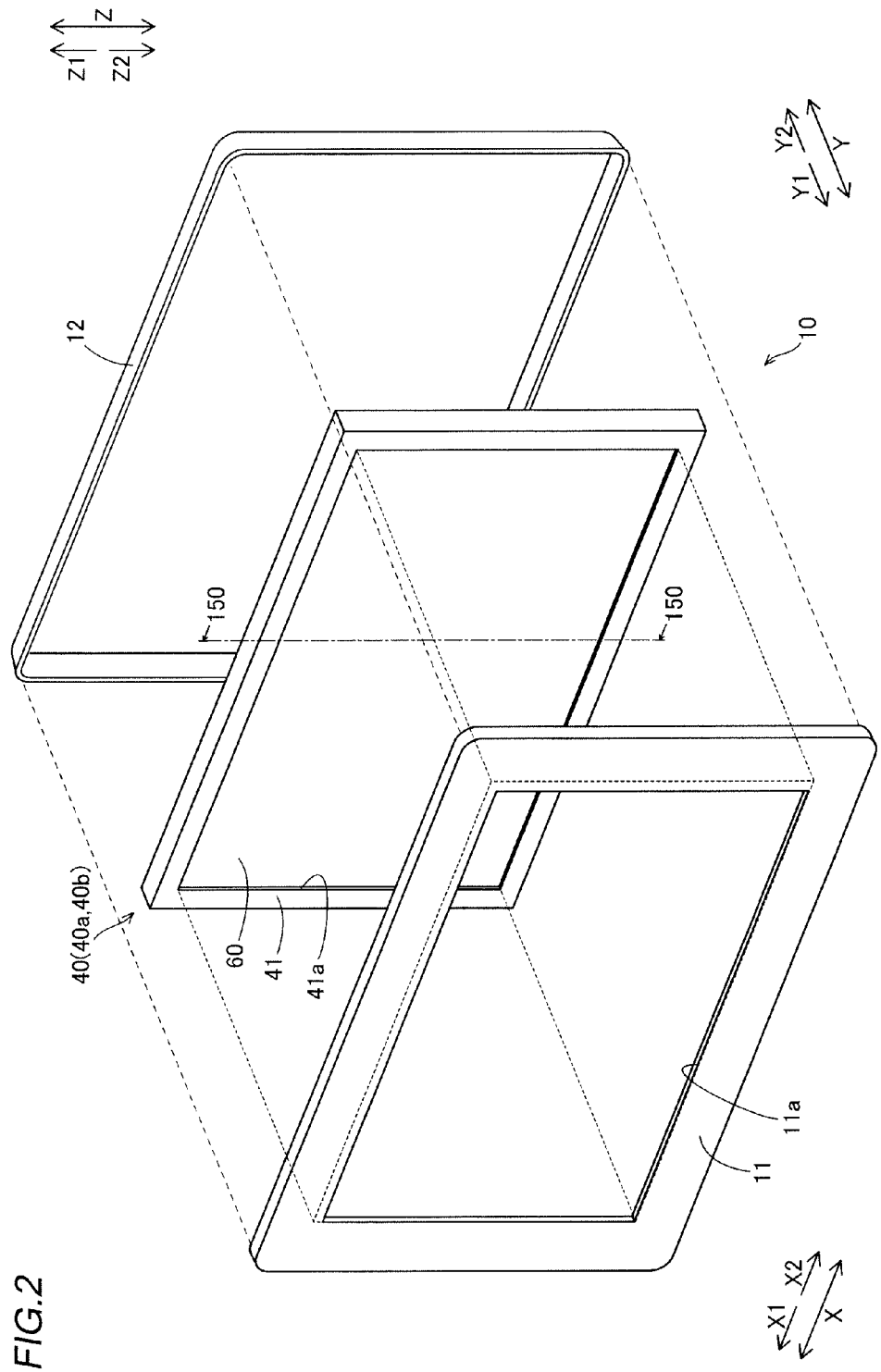
FIG. 2 is an exploded perspective view showing the inner structure a television body of the liquid crystal television according to each of the first to third embodiments of the present invention.

As shown in FIGS. 1 and 2, the television body 10 includes a front cabinet 11 and a rear cabinet 12 each made of resin and a liquid crystal display module 40 having a liquid crystal display cell 60 constituting the display portion 20. The front cabinet 11 and the rear cabinet 12 are examples of the "housing" in the present invention while the same are examples of the "television housing" in the present invention. The liquid crystal display cell 60 is an example of the "display cell" in the present invention. The liquid crystal display module 40 is an example of the "display module" in the present invention.

The front cabinet 11 is arranged on the front side (along arrow Y1) of the liquid crystal television 100. This front cabinet 11 has a frame shape as viewed from the front side (along arrow Y1). Specifically, the front cabinet 11 has a substantially rectangular outer shape as viewed from the front side and a substantially rectangular opening 11a. The opening 11a is provided to expose the display portion 20 (liquid crystal display cell 60 of the liquid crystal display module 40).

The rear cabinet 12 is arranged on the rear side (along arrow Y2) of the liquid crystal television 100. This rear cabinet 12 is so formed as to be fitted into the front cabinet 11. The rear cabinet 12 has a substantially rectangular outer shape as viewed from the front side (along arrow Y1) and is formed in a concave shape concaved rearward (along arrow Y2).

Figure 3:
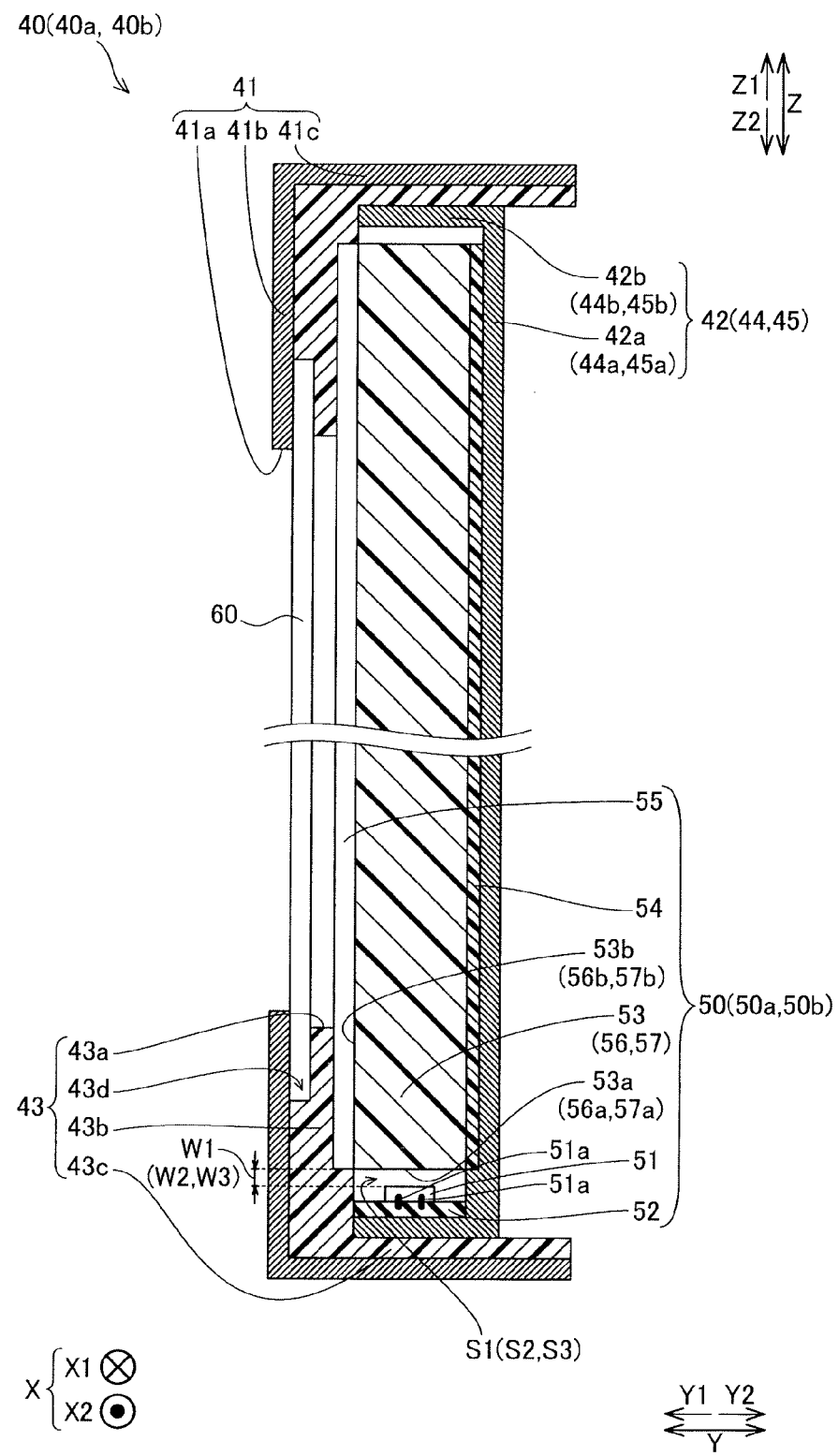
FIG. 3 is a sectional view taken along the line 150-150 in FIG. 2.

As shown in FIG. 2, the liquid crystal display module 40 is stored inside the front cabinet 11 and the rear cabinet 12 of the television body 10. As shown in FIG. 3, the liquid crystal display module 40 includes a front bezel 41 and a rear frame 42 both made of sheet metal such as aluminum and a molded frame 43, a backlight portion 50, and the liquid crystal display cell 60 all arranged between the front bezel 41 and the rear frame 42. The rear frame 42 is an example of the "holding member" in the present invention.

As shown in FIGS. 2 and 3, the front bezel 41 is arranged on the front side (along arrow Y1) of the liquid crystal display module 40. This front bezel 41 is mounted on the rear surface (surface extending along arrow Y2) of the front cabinet 11. The front bezel 41 has a substantially rectangular outer shape as viewed from the front side (along arrow Y1) and a substantially rectangular opening 41a. Specifically, the front bezel 41 has a bottom portion 41b having the opening 41a and a wall portion 41c extending in a direction (along arrow Y2) substantially perpendicular to the bottom portion 41b from the outer periphery (both end portions in directions Y and Z) of the bottom portion 41b, as shown in FIG. 3. The opening 41a of the front bezel 41 is provided to expose the liquid crystal display cell 60. The opening area of the opening 41a of the front bezel 41 is larger than the opening area of the opening 11a of the front cabinet 11.

Figure 5:
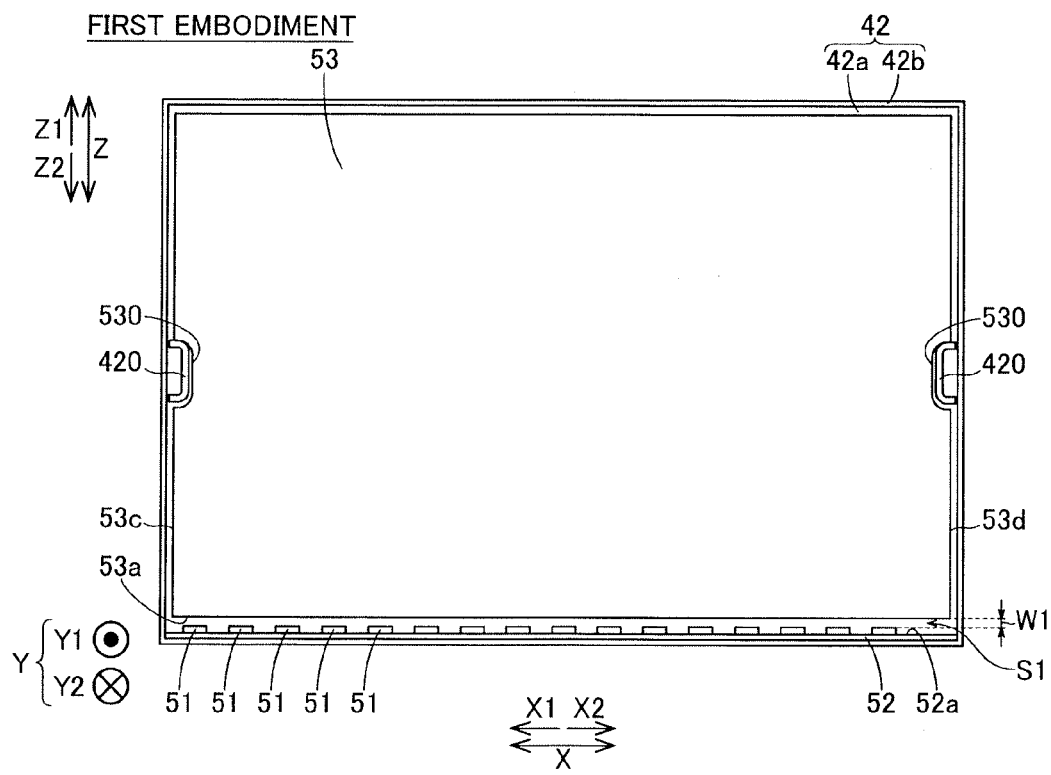
FIG. 5 is a plan view showing a light guide plate, the glass epoxy board, and the LEDs held by a rear frame of the liquid crystal display module according to the first embodiment of the present invention.

As shown in FIGS. 2 and 3, the rear frame 42 is arranged on the rear side (along arrow Y2) of the liquid crystal display module 40. This rear frame 42 has a substantially rectangular outer shape as viewed from the front side (along arrow Y1) and is formed in a concave shape concaved rearward (along arrow Y2), as shown in FIGS. 3 and 5. Specifically, the rear frame 42 has a plate-like bottom portion 42a having no opening and a plate-like wall portion 42b extending in a direction (along arrow Y1) substantially perpendicular to the bottom portion 42a from the outer periphery (both end portions in the directions Y and Z) of the bottom portion 42a, as shown in FIG. 3. The rear frame 42 is so formed as to hold a glass epoxy board 52, a light guide plate 53, and so on described later.

As shown in FIG. 3, the molded frame 43 is so arranged as to come into contact with the bottom surface (surface, extending along arrow Y2, of the bottom portion 41b) of the front bezel 41 and the inner surface of the wall portion 41c. This molded frame 43 has a bottom portion 43b having an opening 43a and a wall portion 43c extending in a direction (along arrow Y2) substantially perpendicular to the bottom portion 43b from the outer periphery (both end portions in the directions Y and Z) of the bottom portion 43b. A step portion 43d is provided on a portion of the bottom portion 43b of the molded frame 43 closer to the front bezel 41 in the periphery of the opening 43a. The vicinity (vicinity of the both end portions in the directions Y and Z) of the outer periphery of the plate-like liquid crystal display cell 60 extending vertically (in the direction Z) and horizontally (in a direction X) is held between this step portion 43d and the front bezel 41. The inner surface of the wall portion 43c of the molded frame 43 is in contact with the outer surface of the wall portion 42b of the rear frame 42.

As shown in FIG. 3, the backlight portion 50 is held inside a space formed in a region where the bottom surface (surface, extending along arrow Y1, of the bottom portion 42a) of the rear frame 42 and the bottom surface (surface, extending along arrow Y2, of the bottom portion 43b) of the molded frame 43 are opposed to each other. This backlight portion 50 is so formed as to apply light to the rear surface (surface extending along arrow Y2) of the liquid crystal display cell 60 from behind (along arrow Y1). Specifically, the backlight portion 50 includes LEDs 51 emitting light, the glass epoxy board 52 mounted with the LEDs 51, the light guide plate 53 guiding the light received from the LEDs 51 to the liquid crystal display cell 60, a reflective sheet 54 reflecting the light received by the light guide plate 53 toward the liquid crystal display cell 60, and an optical sheet 55 adjusting the luminance or the like of the light emitted from the light guide plate 53. The LEDs 51 and the glass epoxy board 52 are examples of the "light source" and the "board" in the present invention, respectively.

Figure 4:
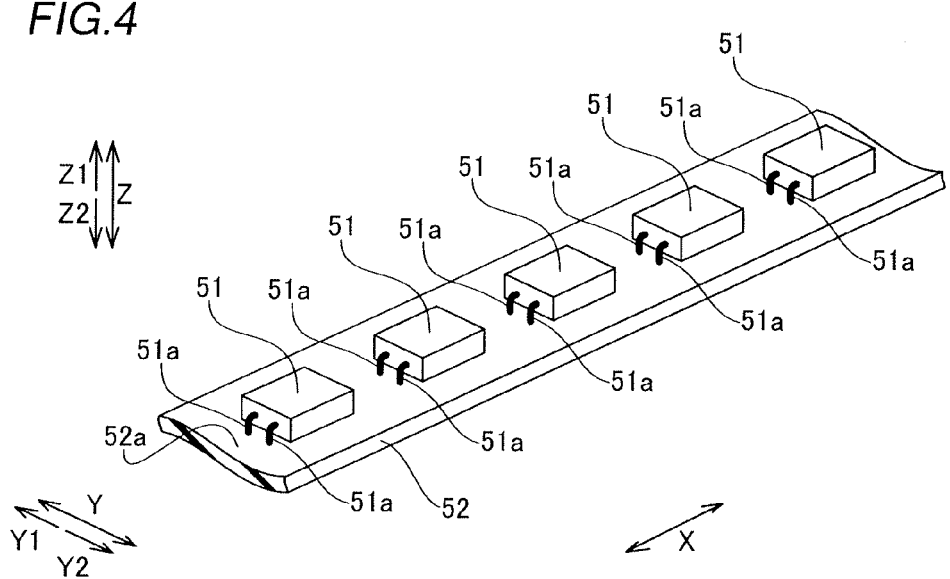
FIG. 4 is a perspective view showing the structure of LEDs and a glass epoxy board of a liquid crystal display module according to each of the first to third embodiments of the present invention.

As shown in FIG. 3, the LEDs 51 and the glass epoxy board 52 are mounted on the inner surface of the wall portion 42b on the lower side (along arrow Z2) of the rear frame 42. A plurality of LEDs 51 are mounted on a mounting surface 52a (surface extending along arrow Z1) of the glass epoxy board 52 at prescribed intervals along a longitudinal direction (direction X) in which the glass epoxy board 52 extends, as shown in FIG. 4. The LEDs 51 and the glass epoxy board 52 are connected to each other through lead terminals 51a.

As shown in FIGS. 3 and 5, the light guide plate 53 is arranged on the rear surface side (along arrow Y2) of the liquid crystal display cell 60 and provided in the form of a substantially rectangular plate extending vertically (in the direction Z) and horizontally (in the direction X). This light guide plate 53 is made of resin such as acrylic allowing transmission of light. The light guide plate 53 has a light-receiving surface 53a (end surface extending along arrow Z2) parallel to the glass epoxy board 52. This light-receiving surface 53a of the light guide plate 53 is so arranged at a prescribed interval (clearance S1 having a width W1 in a vertical direction (direction Z)) above the LEDs 51 (along arrow Z1) as to be opposed to the LEDs 51 (see FIG. 4) on the mounting surface 52a of the glass epoxy board 52. The light-receiving surface 53a is an example of the "first end surface" in the present invention.

As shown in FIG. 3, the reflective sheet 54 is so arranged that the front surface (surface extending along arrow Y1) thereof comes into contact with the rear surface (surface extending along arrow Y2) of the light guide plate 53 while the rear surface (surface extending along arrow Y2) thereof comes into contact with the bottom surface (surface, extending along arrow Y1, of the bottom portion 42a) of the rear frame 42. The reflective sheet 54 is made of resin such as PET (polyethylene terephthalate) having light reflective properties.

According to this structure, the light emitted from the LEDs 51 comes into the light-receiving surface 53a of the light guide plate 53, and thereafter is repetitively multiply-reflected by the reflective sheet 54 to be emitted from a light-emitting surface 53b (surface extending arrow Y1) of the light guide plate 53. Then, the light emitted from the light-emitting surface 53b of the light guide plate 53 is applied to the liquid crystal display cell 60 after the luminance or the like thereof is adjusted by the optical sheet 55. Thus, the liquid crystal display cell 60 displays an image.

Figure 6:
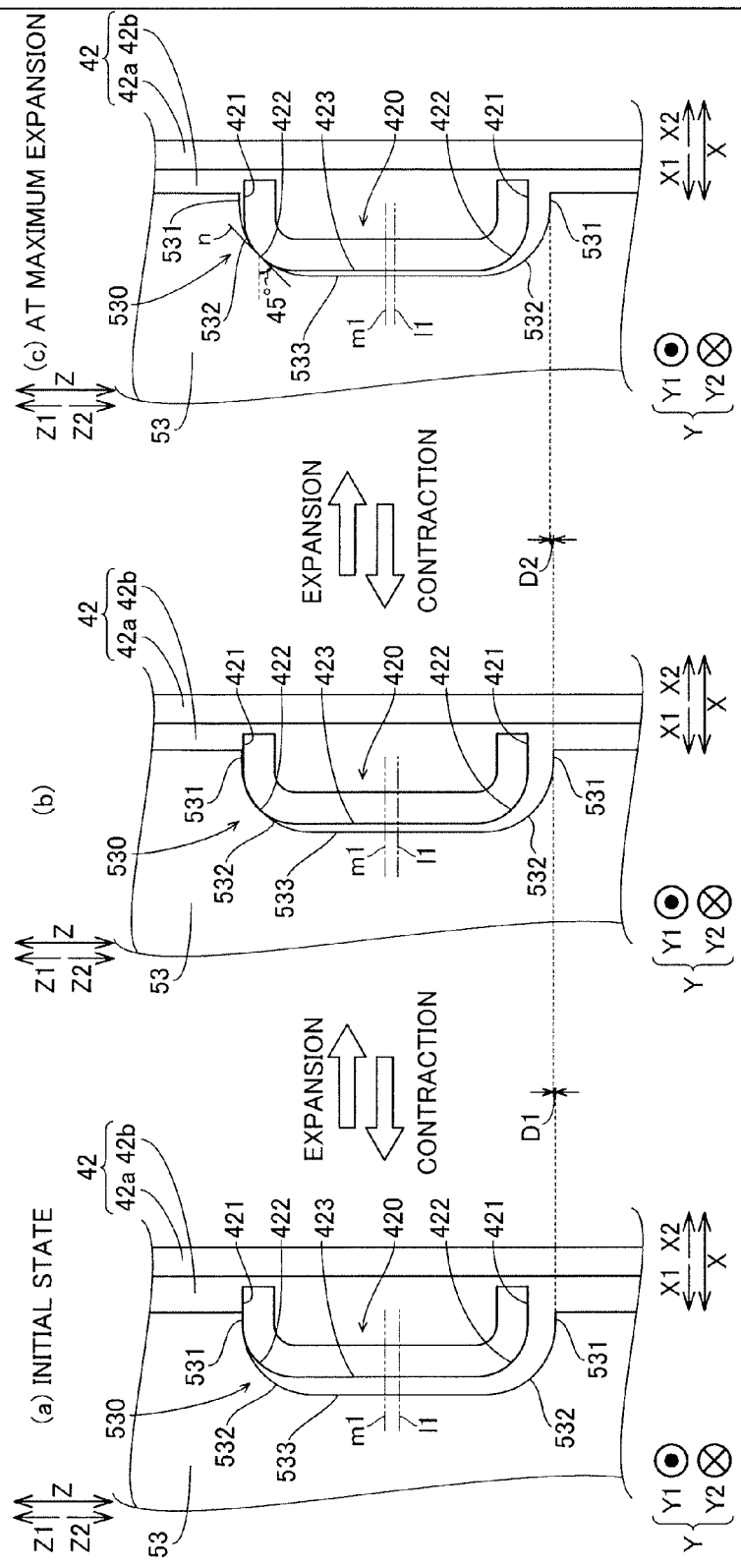
FIG. 6 is an enlarged plan view for illustrating movement of the light guide plate at expansion and contraction of the light guide plate of the liquid crystal display module according to the first embodiment of the present invention.

According to the first embodiment, first engaging portions 530 including recess portions concaved on sides (hereinafter referred to as the inner side) opposite to the wall portion 42b on both sides in a horizontal direction (direction X) of the rear frame 42 are formed on two sides (both sides of the light guide plate 53 in the horizontal direction) of the light guide plate 53 having a rectangular shape, extending in a direction (direction Z) orthogonal to the mounting surface 52a of the glass epoxy board 52, as shown in FIGS. 5 and 6. These first engaging portions 530 are formed by notching the vicinities of central portions in the vertical direction (direction Z) of both side end surfaces (side end surfaces 53c and 53d) in the horizontal direction of the light guide plate 53 to the inner side. As shown in FIG. 5, the side end surfaces 53c and 53d of the light guide plate 53 are perpendicular to the mounting surface 52a of the glass epoxy board 52. These side end surfaces 53c and 53d are examples of the "second end surface" in the present invention.

Figure 7:
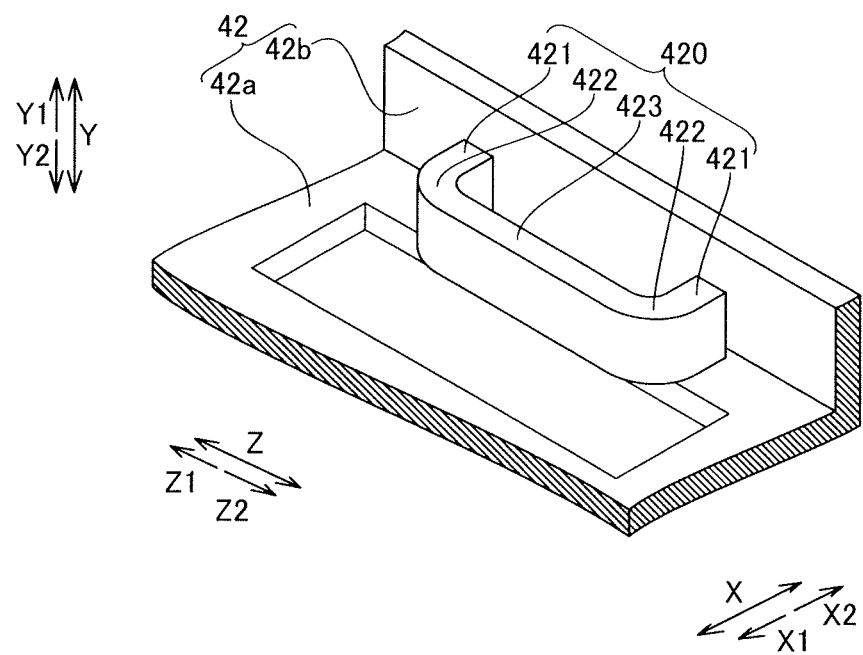
FIG. 7 is an exploded perspective view showing a second engaging portion of the rear frame of the liquid crystal display module according to the first embodiment of the present invention.

According to the first embodiment, second engaging portions 420 including projecting portions in shapes corresponding to the shapes of the first engaging portions 530 including the aforementioned recess portions of the light guide plate 53 are formed on two sides (the bottom portion 42a of the rear frame 42 on both sides in the horizontal direction (direction X)) of the rear frame 42 having a rectangular shape, extending in the direction (direction Z) perpendicular to the mounting surface 52a of the glass epoxy board 52, as shown in FIGS. 5 and 6. These second engaging portions 420 are integrally formed on the rear frame 42 (bottom portion 42a) by partially uprightly folding the vicinities of central portions in the vertical direction on both sides in the horizontal direction (hereinafter referred to as the outer side) of the bottom portion 42a of the rear frame 42 made of sheet metal and curving both end portions of the partially uprightly folded portions in the vertical direction toward the outer side, as shown in FIG. 7. The second engaging portions 420 are so formed as to be raised in the direction (along arrow Y1) substantially perpendicular to the bottom portion 42a.

According to the first embodiment, the first engaging portions 530 of the light guide plate 53 and the second engaging portions 420 of the rear frame 42 are formed in shapes allowing the first engaging portions 530 of the light guide plate 53 to move in the direction (direction Z) perpendicular to the mounting surface 52a of the glass epoxy board 52 in response to expansion or contraction of the light guide plate 53 when the light guide plate 53 expands or contracts.

The shapes of a first engaging portion 530 of the light guide plate 53 and a second engaging portion 420 of the rear frame 42 are hereinafter described in detail with reference to FIG. 6. The first engaging portion 530 of the light guide plate 53 and the second engaging portion 420 of the rear frame 42 are so formed as to be substantially axisymmetric about a straight line 11 and a straight line m1 extending in the horizontal direction (direction X) through central portions of the first engaging portion 530 and the second engaging portion 420 in the vertical direction (direction Z), respectively, as shown in FIG. 6.

As shown in FIG. 6, the first engaging portion 530 of the light guide plate 53 is formed in a shape including parallel portions 531 extending in a direction (direction X) parallel to the mounting surface 52a of the glass epoxy board 52 and arcuate portions 532 each in the form of an arc having a radius of curvature R1. A set of a parallel portion 531 and an arcuate portion 532 is provided on each side with respect to the straight line 11 of the first engaging portion 530. End portions of the parallel portions 531 on the inner side and end portions of the arcuate portions 532 on the outer side are coupled with each other. The arcuate portion 532 located on the upper side (along arrow Z1) with respect to the straight line 11 and the arcuate portion 532 located on the lower side (along arrow Z2) with respect to the straight line 11 are coupled with each other through a coupling portion 533 extending vertically (in the direction Z). The parallel portion 531 is an example of the "first parallel portion" in the present invention.

Similarly, the second engaging portion 420 of the rear frame 42 is formed in a shape including parallel portions 421 extending in the direction (direction X) parallel to the mounting surface 52a of the glass epoxy board 52 and arcuate portions 422 each in the form of an arc having a radius of curvature R2. A set of a parallel portion 421 and an arcuate portion 422 is provided on each side with respect to the straight line m1 of the second engaging portion 420. End portions of the parallel portions 421 on the inner side and end portions of the arcuate portions 422 on the outer side are coupled with each other. The arcuate portion 422 located on the upper side (along arrow Z1) with respect to the straight line m1 and the arcuate portion 422 located on the lower side (along arrow Z2) with respect to the straight line m1 are coupled with each other through a coupling portion 423 extending vertically (in the direction Z). The parallel portion 421 is an example of the "first parallel portion" in the present invention.

According to the first embodiment, the radius of curvature R1 of the arcuate portion 532 of the first engaging portion 530 of the light guide plate 53 is larger than the radius of curvature R2 of the arcuate portion 422 of the second engaging portion 420 of the rear frame 42. The radius of curvature R1 of the arcuate portion 532 of the first engaging portion 530 of the light guide plate 53 and the radius of curvature R2 of the arcuate portion 422 of the second engaging portion 420 of the rear frame 42 are preferably so set that an inclination angle of a tangent n between the arcuate portion 532 and the arcuate portion 422 with respect to the horizontal direction (direction X) is 45° when the light guide plate 53 maximally expands in the horizontal direction (direction X) (at maximum expansion), as shown in FIG. 6 (c). Specifically, the radius of curvature R1 of the arcuate portion 532 of the first engaging portion 530 of the light guide plate 53 and the radius of curvature R2 of the arcuate portion 422 of the second engaging portion 420 of the rear frame 42 are preferably so set as to satisfy an expression of $\Delta=(2-\sqrt{2})\times(R1-R2)$ when the maximum value of the amount of expansion of the light guide plate 53 in the horizontal direction (direction Y) is $\Delta$.

Next, movement of the light guide plate 53 in the vertical direction (direction Z) at the expansion or contraction of the light guide plate 53 according to the first embodiment is described with reference to FIG. 6.

In the state where the light guide plate 53 neither expands nor contracts (initial state (see FIG. 6 (a))), the light guide plate 53 is fixed onto the rear frame 42, whereby the light guide plate 53 does not move.

When the light guide plate 53 expands in this state, the arcuate portion 532 of the first engaging portion 530 of the light guide plate 53 moves upward (along arrow Z1) along the arcuate portion 422 of the second engaging portion 420 of the rear frame 42 so that the light guide plate 53 moves upward by a prescribed distance (D1 or D2), as shown in FIG. 6. Then, the light guide plate 53 (first engaging portion 530) stops when the light guide plate 53 maximally expands (at maximum expansion (see FIG. 6 (c)).

Similarly, when the light guide plate 53 contracts in the state where the light guide plate 53 maximally expands (at maximum expansion (see FIG. 6 (c)), the arcuate portion 532 of the first engaging portion 530 of the light guide plate 53 moves downward (along arrow Z2) along the arcuate portion 422 of the second engaging portion 420 of the rear frame 42 so that the light guide plate 53 moves downward by the prescribed distance (D2 or D1), as shown in FIG. 6. Then, the light guide plate 53 (first engaging portion 530) stops when the light guide plate 53 maximally contracts (initial state (see FIG. 6 (a)).

As described above, the first engaging portion 530 of the light guide plate 53 moves in a direction (along arrow Z1) separating from the mounting surface 52a of the glass epoxy board 52 in response to the expansion of the light guide plate 53 when the light guide plate 53 expands. The first engaging portion 530 of the light guide plate 53 moves in a direction (along arrow Z2) approaching the mounting surface 52a of the glass epoxy board 52 in response to the contraction of the light guide plate 53 when the light guide plate 53 contracts. Thus, the light guide plate 53 (first engaging portion 530) moves vertically (in the direction Z) in response to the expansion or contraction of the light guide plate 53 even when the clearance S1 (see FIGS. 3 and 5) between the light guide plate 53 and the LEDs 51 is changed by the expansion or contraction of the light guide plate 53, and hence the amount of change in the clearance S1 is reduced.

According to the first embodiment, as hereinabove described, the first engaging portions 530 of the light guide plate 53 and the second engaging portions 420 of the rear frame 42 are formed in the shapes allowing the first engaging portions 530 of the light guide plate 53 to move in the direction (direction Z) orthogonal to the mounting surface 52a of the glass epoxy board 52 in response to the expansion or contraction of the light guide plate 53 when the light guide plate 53 expands or contracts. Thus, the light guide plate 53 can move in the direction orthogonal to the mounting surface 52a of the glass epoxy board 52 to cancel a change in the distance (clearance S1) between the LEDs 51 and the light guide plate 53 even when the distance is changed by the expansion or contraction of the light guide plate 53 due to heat or the like generated from the LEDs 51, and hence the amount of change in the clearance S1 between the LEDs 51 and the light guide plate 53 can be reduced. Consequently, the optical characteristics of backlight emitted from the light guide plate 53 can be stabilized.

According to the first embodiment, as hereinabove described, the first engaging portions 530 of the light guide plate 53 and the second engaging portions 420 of the rear frame 42 are formed in shapes allowing the first engaging portions 530 of the light guide plate 53 to move in the direction (along arrow Z1) separating from the mounting surface 52a of the glass epoxy board 52 in response to the expansion of the light guide plate 53 when the light guide plate 53 expands and allowing the first engaging portions 530 of the light guide plate 53 to move in the direction (along arrow Z2) approaching the mounting surface 52a of the glass epoxy board 52 in response to the contraction of the light guide plate 53 when the light guide plate 53 contracts.

Thus, the light guide plate 53 can move in the direction separating from the mounting surface 52a (LEDs 51) of the glass epoxy board 52 in response to the expansion of the light guide plate 53 when the clearance S1 between the LEDs 51 and the light guide plate 53 is reduced by the expansion of the light guide plate 53, whereas the light guide plate 53 can move in the direction approaching the mounting surface 52a (LEDs 51) of the glass epoxy board 52 in response to the contraction of the light guide plate 53 when the clearance S1 between the LEDs 51 and the light guide plate 53 is increased by the contraction of the light guide plate 53. Consequently, the amount of change in the clearance S1 between the LEDs 51 and the light guide plate 53 can be easily reduced, and hence the optical characteristics of the backlight emitted from the light guide plate 53 can be easily stabilized.

According to the first embodiment, as hereinabove described, the light guide plate 53 is arranged above the mounting surface 52a of the glass epoxy board 52 (along arrow Z1). Furthermore, portions (arcuate portions 532 and arcuate portions 422) in shapes allowing the first engaging portions 530 of the light guide plate 53 to move upward (along arrow Z1) or downward (along arrow Z2) above the mounting surface 52a of the glass epoxy board 52 in response to the expansion or contraction of the light guide plate 53 when the light guide plate 53 expands or contracts are provided on portions of the first engaging portions 530 of the light guide plate 53 and the second engaging portions 420 of the rear frame 42 coming into contact with each other by the weight of the light guide plate 53 when the first engaging portions 530 and the second engaging portions 420 engage with each other.

Although it is necessary to press the light guide plate 53 toward the LEDs 51 (along arrow Z2) in order to keep the clearance S1 between the LEDs 51 and the light guide plate 53 substantially constant in the state where the light guide plate 53 neither expands nor contrasts, the light guide plate 53 can be easily pressed toward the LEDs 51 employing the weight of the light guide plate 53 according to the first embodiment. In other words, no urging member or the like to press the light guide plate 53 toward the LEDs 51 of the glass epoxy board 52 may be provided separately, and hence the clearance S1 between the LEDs 51 and the light guide plate 53 can be kept substantially constant employing the simple structure in the state where the light guide plate 53 neither expands nor contracts.

According to the first embodiment, as hereinabove described, the arcuate portions 532 and 422 engaging with each other and coming into contact with each other in the state where the light guide plate 53 expands or contracts are provided on the first engaging portion 530 of the light guide plate 53 and the second engaging portion 420 of the rear frame 42, respectively. Furthermore, the radius of curvature R1 of the arcuate portion 532 of the first engaging portion 530 of the light guide plate 53 is larger than the radius of curvature R2 of the arcuate portion 422 of the second engaging portion 420 of the rear frame 42. Thus, the arcuate portion 532 of the first engaging portion 530 of the light guide plate 53 can move along the arcuate portion 422 of the second engaging portion 420 of the rear frame 42 in the state where the light guide plate 53 expands or contracts, and hence the first engaging portion 530 of the light guide plate 53 can easily move in the direction (along arrow Z1) separating from or the direction (along arrow Z2) approaching the mounting surface 52a of the glass epoxy board 52.

According to the first embodiment, as hereinabove described, in addition to the arcuate portions 532 and 422, the parallel portions 531 and 421 extending in the direction (direction X) parallel to the mounting surface 52a of the glass epoxy board 52, engaging with each other and coming into contact with each other in the state where the light guide plate 53 neither expands nor contracts are provided on the first engaging portion 530 of the light guide plate 53 and the second engaging portion 420 of the rear frame 42, respectively. Thus, the light guide plate 53 can be stably held by the rear frame 42 with the parallel portions 531 and 421 extending in the direction parallel to the mounting surface 52a of the glass epoxy board 52 that the first engaging portion 530 of the light guide plate 53 and the second engaging portion 420 of the rear frame 42 have in the state where the light guide plate 53 and the rear frame 42 are in contact with each other, when the light guide plate 53 neither expands nor contracts.

According to the first embodiment, as hereinabove described, the light guide plate 53 and the rear frame 42 each have a rectangular shape, and the first engaging portions 530 and the second engaging portions 420 are formed on the two sides (both sides in the horizontal direction (direction X)) of the light guide plate 53 and the rear frame 42 each having the rectangular shape, extending in the direction (direction Z) orthogonal to the mounting surface 52a of the glass epoxy board 52, respectively. Thus, the light guide plate 53 moving in the direction orthogonal to the mounting surface 52a of the glass epoxy board 52 can be stably supported by the first engaging portions 530 and the second engaging portions 420 formed on the two sides of the light guide plate 53 and the rear frame 42 each having the rectangular shape, extending in the direction orthogonal to the mounting surface 52a of the glass epoxy board 52.

According to the first embodiment, as hereinabove described, the first engaging portions 530 include the recess portions while the second engaging portions 420 include the projecting portions engaging with the recess portions by coming into contact with the first engaging portions 530. Thus, the amount of change in the clearance S1 between the LEDs 51 and the light guide plate 53 can be easily reduced by the first engaging portions 530 and the second engaging portions 420 each having the simple structure.

Second Embodiment

First, the structure of a liquid crystal television 200 according to a second embodiment of the present invention is described with reference to FIGS. 1 to 4, 8 and 9. The liquid crystal television 200 is an example of the "display device" or the "liquid crystal television set" in the present invention. In this second embodiment, portions (see FIG. 8) coming into contact with each other when a light guide plate 56 and a rear frame 44 engage with each other include portions (inclined portions 561 and 441) inclined by a prescribed angle θ1 with respect to a mounting surface 52a dissimilarly to the aforementioned first embodiment in which the portions (see FIG. 6) coming into contact with each other when the light guide plate 53 and the rear frame 42 engage with each other include the portions (parallel portions 531 and 421) parallel to the mounting surface 52a of the glass epoxy board 52 and the arcuate portions (532 and 422).

The liquid crystal television 200 according to the second embodiment includes a liquid crystal display module 40a and front and rear cabinets 11 and 12 storing the liquid crystal display module 40a inside, as shown in FIGS. 1 and 2. As shown in FIG. 3, the liquid crystal display module 40a includes a front bezel 41, the rear frame 44, a molded frame 43 arranged between the front bezel 41 and the rear frame 44, a backlight portion 50a, and a liquid crystal display cell 60. The liquid crystal display module 40a is an example of the "display module" in the present invention. The rear frame 44 is an example of the "holding member" in the present invention.

As shown in FIG. 3, the backlight portion 50a includes LEDs 51 emitting light, a glass epoxy board 52 mounted with the LEDs 51, the light guide plate 56 guiding the light received by a light-receiving surface 56a (end surface extending along arrow Z2) from the LEDs 51 to the liquid crystal display cell 60, a reflective sheet 54 reflecting the light received by the light guide plate 56 toward the liquid crystal display cell 60, and an optical sheet 55 adjusting the luminance or the like of the light emitted from a light-emitting surface 56b (surface extending along arrow Y1) of the light guide plate 56. The light-receiving surface 56a of the light guide plate 56 is parallel to the mounting surface 52a of the glass epoxy board 52. The light-receiving surface 56a of the light guide plate 56 is so arranged at a prescribed interval (clearance S2 having a width W2 in a vertical direction (direction Z)) above the LEDs 51 (along arrow Z1) as to be opposed to the LEDs 51 (see FIG. 4) on the mounting surface 52a of the glass epoxy board 52. This light-receiving surface 56a of the light guide plate 56 is an example of the "first end surface" in the present invention.

Figure 8:
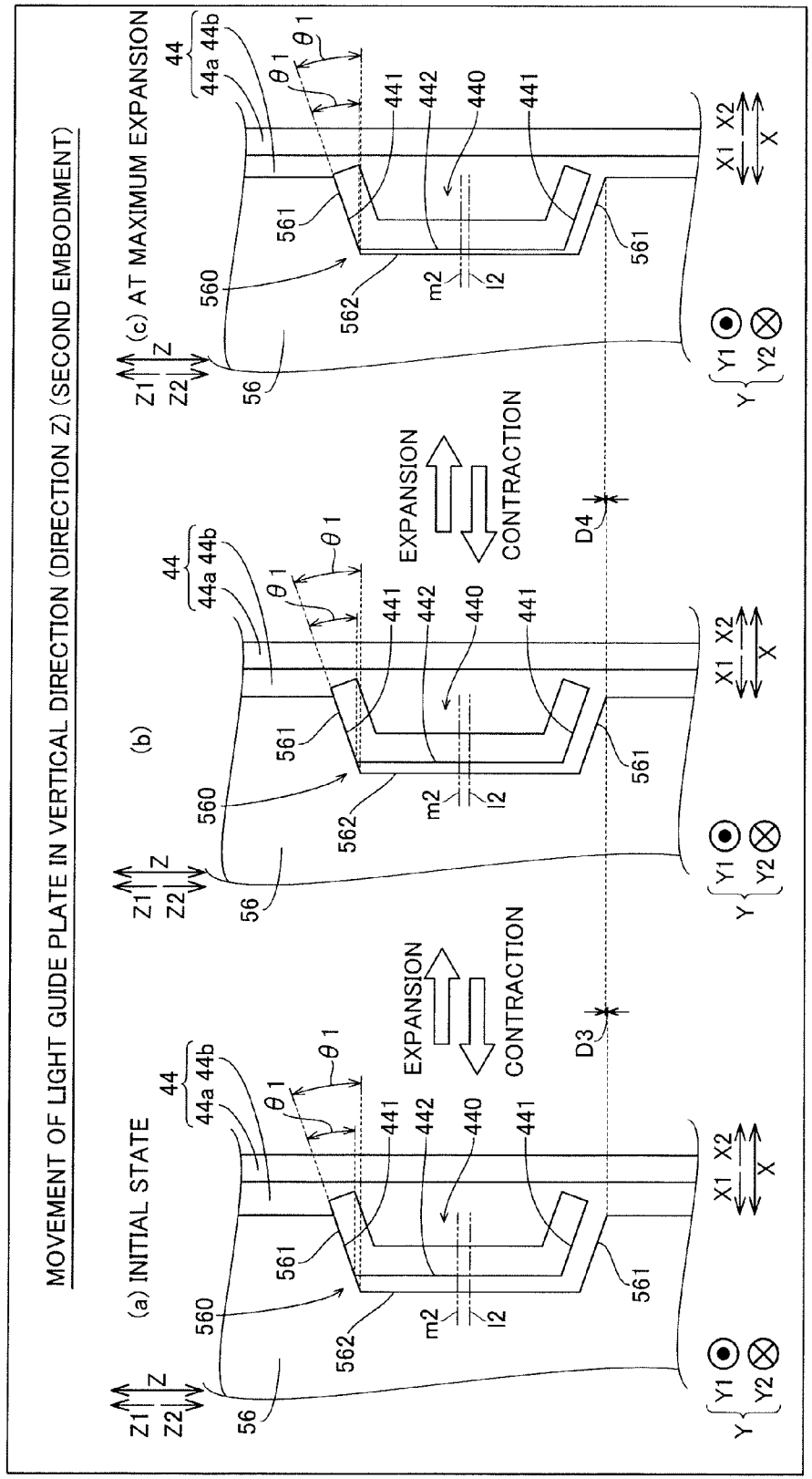
FIG. 8 is an enlarged plan view for illustrating movement of a light guide plate at expansion and contraction of the light guide plate of the liquid crystal display module according to the second embodiment of the present invention.
Figure 9:
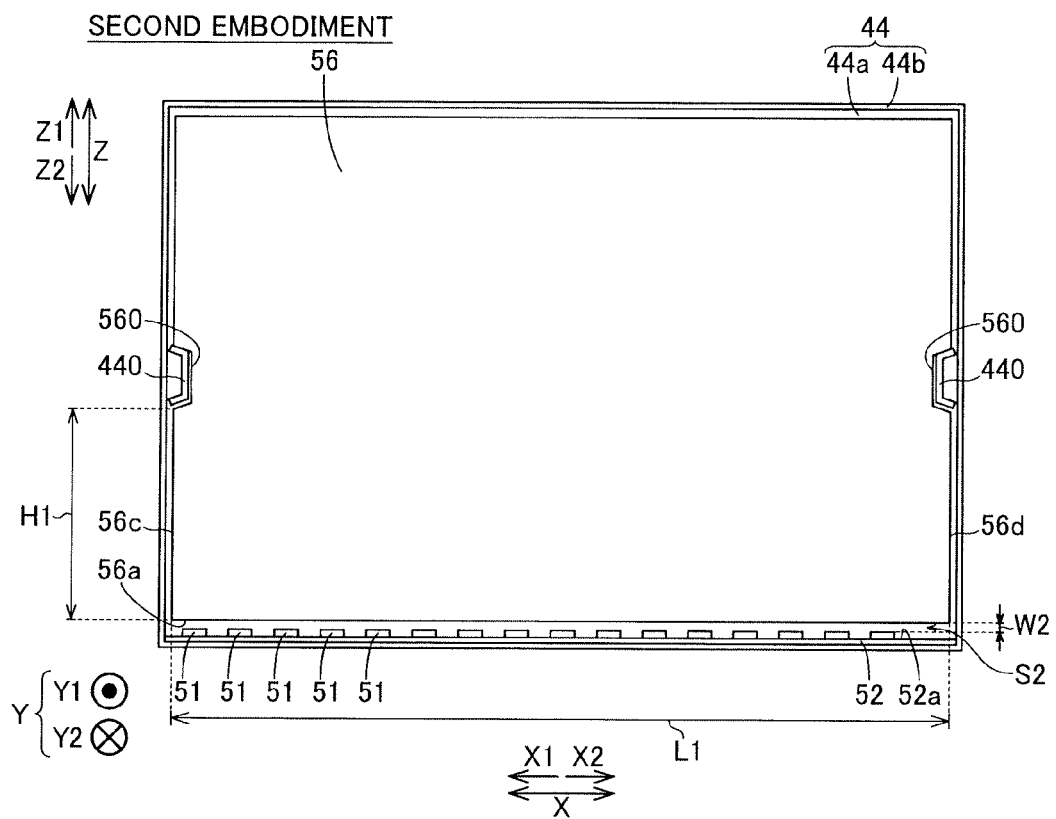
FIG. 9 is a plan view showing the light guide plate, the glass epoxy board, and the LEDs held by a rear frame of the liquid crystal display module according to the second embodiment of the present invention.

According to the second embodiment, first engaging portions 560 including recess portions concaved on sides (hereinafter referred to as the inner side) opposite to a wall portion 44b on both sides in a horizontal direction (direction X) of the rear frame 44 are formed in the vicinity of central portions in the vertical direction (direction Z) of both side end surfaces (side end surfaces 56c and 56d) in the horizontal direction of the light guide plate 56, as shown in FIGS. 8 and 9. Second engaging portions 440 including projecting portions in shapes corresponding to the shapes of the first engaging portions 560 including the aforementioned recess portions of the light guide plate 56 are formed in the vicinity of central portions in the vertical direction on both sides in the horizontal direction (hereinafter referred to as the outer side) of a bottom portion 44a of the rear frame 44. As shown in FIG. 9, the side end surfaces 56c and 56d of the light guide plate 56 are perpendicular to the mounting surface 52a of the glass epoxy board 52. These side end surfaces 56c and 56d of the light guide plate 56 are examples of the "second end surface" in the present invention.

The shapes of a first engaging portion 560 of the light guide plate 56 and a second engaging portion 440 of the rear frame 44 are hereinafter described in detail. The first engaging portion 560 of the light guide plate 56 and the second engaging portion 440 of the rear frame 44 are so formed as to be substantially axisymmetric about a straight line 12 and a straight line m2 extending in the horizontal direction (direction X) through central portions of the first engaging portion 560 and the second engaging portion 440 in the vertical direction (direction Z), respectively, as shown in FIG. 8.

As shown in FIG. 8, the first engaging portion 560 of the light guide plate 56 is formed in a shape including the inclined portions 561 inclined by the prescribed angle θ1 with respect to the mounting surface 52a of the glass epoxy board 52 in a direction (along arrow Z1) separating from the mounting surface 52a. An inclined portion 561 is provided on each side with respect to the straight line 12 of the first engaging portion 560. The inclined portion 561 located on the upper side (along arrow Z1) with respect to the straight line 12 and the inclined portion 561 located on the lower side (along arrow Z2) with respect to the straight line 12 are coupled with each other through a coupling portion 562 extending vertically (in the direction Z).

Similarly, the second engaging portion 440 of the rear frame 44 is formed in a shape including the inclined portions 441 inclined by the prescribed angle θ1 with respect to the mounting surface 52a of the glass epoxy board 52 in the direction (along arrow Z1) separating from the mounting surface 52a. An inclined portion 441 is provided on each side with respect to the straight line m2 of the second engaging portion 440. The inclined portion 441 located on the upper side (along arrow Z1) with respect to the straight line m2 and the inclined portion 441 located on the lower side (along arrow Z2) with respect to the straight line m2 are coupled with each other through a coupling portion 442 extending vertically (in the direction Z).

According to the second embodiment, the inclination angles θ1 of the inclined portion 561 of the first engaging portion 560 of the light guide plate 56 and the inclined portion 441 of the second engaging portion 440 of the rear frame 44 with respect to the mounting surface 52a of the glass epoxy board 52 are preferably so set as to be equal to arctan (H1/L1), where L1 (see FIG. 9) denotes the length of the light-receiving surface 56a of the light guide plate 56 in a longitudinal direction (direction X) and H1 (see FIG. 9) denotes a distance from the light-receiving surface 56a to the lower end portion (end portion along arrow Z2) of each of the first engaging portions 560 formed on the side end surfaces 56c and 56d of the light guide plate 56.

The remaining structure of the liquid crystal television 200 according to the second embodiment is similar to that of the liquid crystal television 100 according to the aforementioned first embodiment.

Next, movement of the light guide plate 56 in the vertical direction (direction Z) at expansion or contraction of the light guide plate 56 according to the second embodiment is described with reference to FIG. 8.

In the state where the light guide plate 56 neither expands nor contracts (initial state (see FIG. 8 (a))), the light guide plate 56 is fixed onto the rear frame 44, whereby the light guide plate 56 does not move.

When the light guide plate 56 expands in this state, the inclined portion 561 of the first engaging portion 560 of the light guide plate 56 moves upward (along arrow Z1) along the inclined portion 441 of the second engaging portion 440 of the rear frame 44 so that the light guide plate 56 moves upward by a prescribed distance (D3 or D4), as shown in FIG. 8. Then, the light guide plate 56 (first engaging portion 560) stops when the light guide plate 56 maximally expands (at maximum expansion (see FIG. 8 (c)).

Similarly, when the light guide plate 56 contracts in the state where the light guide plate 56 maximally expands (at maximum expansion (see FIG. 8 (c)), the inclined portion 561 of the first engaging portion 560 of the light guide plate 56 moves downward (along arrow Z2) along the inclined portion 441 of the second engaging portion 440 of the rear frame 44 so that the light guide plate 56 moves downward by the prescribed distance (D4 or D3), as shown in FIG. 8. Then, the light guide plate 56 (first engaging portion 560) stops when the light guide plate 56 maximally contracts (initial state (see FIG. 8 (a)).

As described above, the first engaging portion 560 of the light guide plate 56 moves in the direction (along arrow Z1) separating from the mounting surface 52a of the glass epoxy board 52 in response to the expansion of the light guide plate 56 when the light guide plate 56 expands. The first engaging portion 560 of the light guide plate 56 moves in a direction (along arrow Z2) approaching the mounting surface 52a of the glass epoxy board 52 in response to the contraction of the light guide plate 56 when the light guide plate 56 contracts. Thus, the light guide plate 56 (first engaging portions 560) moves vertically (in the direction Z) in response to the expansion or contraction of the light guide plate 56 even when the clearance S2 (see FIGS. 3 and 9) between the light guide plate 56 and the LEDs 51 is changed by the expansion or contraction of the light guide plate 56, and hence the change in the clearance S2 is cancelled.

According to the second embodiment, as hereinabove described, the inclined portions 561 and 441 inclined by the prescribed angle θ1 with respect to the mounting surface 52a of the glass epoxy board 52 in the direction separating from the mounting surface 52a, engaging with each other and coming into contact with each other in the state where the light guide plate 56 expands or contracts are provided on the first engaging portion 560 of the light guide plate 56 and the second engaging portion 440 of the rear frame 44, respectively. Thus, the first engaging portion 560 can move along the inclined portions 561 and 441 that the first engaging portion 560 and the second engaging portion 440 have in the state where the light guide plate 56 expands or contracts, and hence the first engaging portion 560 of the light guide plate 56 can easily move in the direction (along arrow Z1) separating from or the direction (along arrow Z2) approaching the mounting surface 52a of the glass epoxy board 52.

According to the second embodiment, as hereinabove described, the prescribed angle θ1 is so set as to be equal to arctan (H1/L1), where L1 denotes the length of the light-receiving surface 56a, parallel to the mounting surface 52a of the glass epoxy board 52, of the light guide plate 56 in the longitudinal direction (direction X) and H1 denotes the distance from the light-receiving surface 56a to each of the first engaging portions 560 formed on the side end surfaces (56c and 56d) of the light guide plate 56 in the horizontal direction (direction X). The prescribed angle θ1 is set in this manner, whereby the first engaging portion 560 moves along the inclined portions 561 and 441 that the first engaging portion 560 and the second engaging portion 440 have in the state where the light guide plate 56 expands or contracts so that the clearance S2 between the light guide plate 56 and the LEDs 51 can be kept substantially constant.

The remaining effects of the second embodiment are similar to those of the aforementioned first embodiment.

Third Embodiment

First, the structure of a liquid crystal television 300 according to a third embodiment of the present invention is described with reference to FIGS. 1 to 4, 10 and 11. The liquid crystal television 300 is an example of the "display device" or the "liquid crystal television set" in the present invention. In this third embodiment, portions (see FIG. 10) coming into contact with each other when a light guide plate 57 and a rear frame 45 engage with each other include portions (inclined portions 571 and 451) inclined by a prescribed angle θ2 with respect to a mounting surface 52a and portions (parallel portions 572 and 452) parallel to the mounting surface 52a dissimilarly to the aforementioned second embodiment in which the portions (see FIG. 8) coming into contact with each other when the light guide plate 56 and the rear frame 44 engage with each other include only the portions (inclined portions 561 and 441) inclined by the prescribed angle θ1 with respect to the mounting surface 52a (see FIG. 4) of the glass epoxy board 52.

The liquid crystal television 300 according to the third embodiment includes a liquid crystal display module 40b and front and rear cabinets 11 and 12 storing the liquid crystal display module 40b inside, as shown in FIGS. 1 and 2. As shown in FIG. 3, the liquid crystal display module 40b includes a front bezel 41, the rear frame 45, a molded frame 43 arranged between the front bezel 41 and the rear frame 45, a backlight portion 50b, and a liquid crystal display cell 60. The liquid crystal display module 40b is an example of the "display module" in the present invention. The rear frame 45 is an example of the "holding member" in the present invention.

As shown in FIG. 3, the backlight portion 50b includes LEDs 51 emitting light, a glass epoxy board 52 mounted with the LEDs 51, the light guide plate 57 guiding the light received by a light-receiving surface 57a (end surface extending along arrow Z2) from the LEDs 51 to the liquid crystal display cell 60, a reflective sheet 54 reflecting the light received by the light guide plate 57 toward the liquid crystal display cell 60, and an optical sheet 55 adjusting the luminance or the like of the light emitted from a light-emitting surface 57b (surface extending along arrow Y1) of the light guide plate 57. The light-receiving surface 57a of the light guide plate 57 is parallel to the mounting surface 52a of the glass epoxy board 52. The light-receiving surface 57a of the light guide plate 57 is so arranged at a prescribed interval (clearance S3 having a width W3 in a vertical direction (direction Z)) above the LEDs 51 (along arrow Z1) as to be opposed to the LEDs 51 (see FIG. 4) on the mounting surface 52a of the glass epoxy board 52. This light-receiving surface 57a of the light guide plate 57 is an example of the "first end surface" in the present invention.

Figure 10:
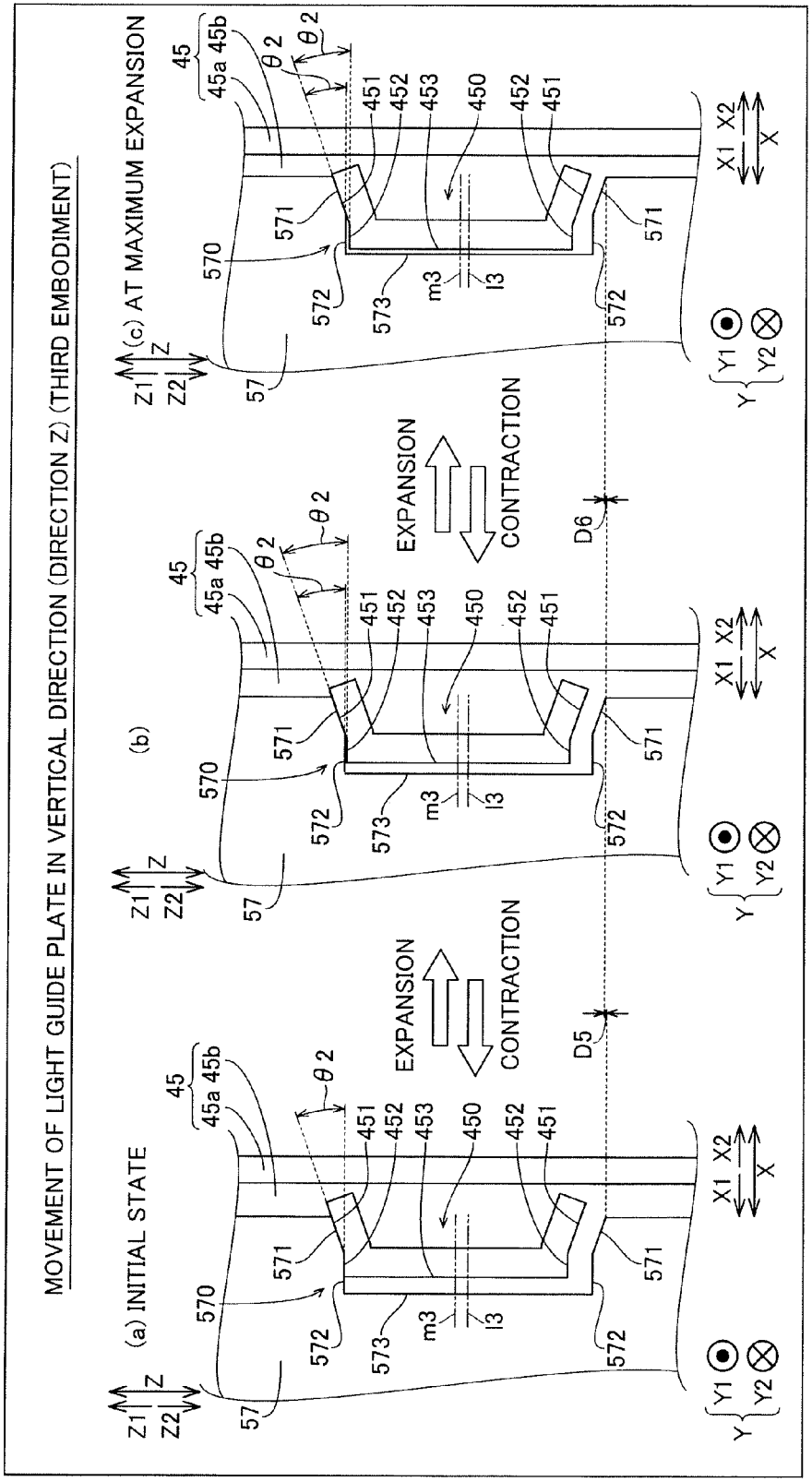
FIG. 10 is an enlarged plan view for illustrating movement of a light guide plate at expansion and contraction of the light guide plate of the liquid crystal display module according to the third embodiment of the present invention.
Figure 11:
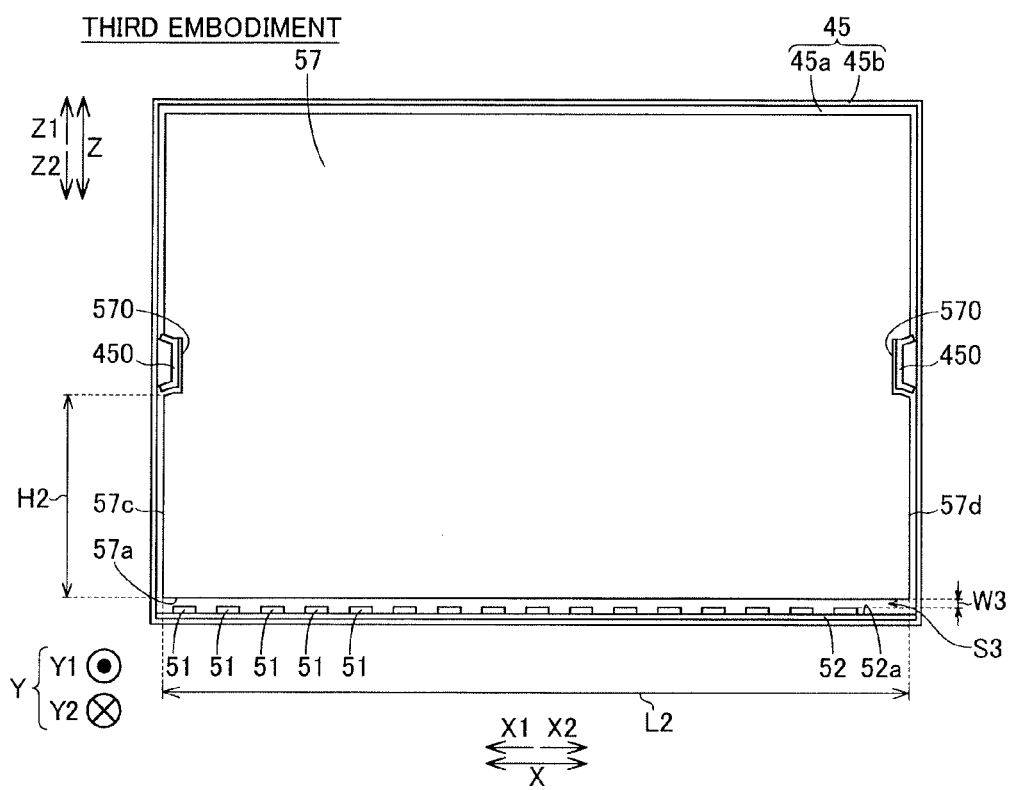
FIG. 11 is a plan view showing a light guide plate, the glass epoxy board, and the LEDs held by a rear frame of the liquid crystal display module according to the third embodiment of the present invention.

According to the third embodiment, first engaging portions 570 including recess portions concaved on sides (hereinafter referred to as the inner side) opposite to a wall portion 45b on both sides in a horizontal direction (direction X) of the rear frame 45 are formed in the vicinity of central portions in the vertical direction (direction Z) of both side end surfaces (side end surfaces 57c and 57d) in the horizontal direction of the light guide plate 57, as shown in FIGS. 10 and 11. Second engaging portions 450 including projecting portions in shapes corresponding to the shapes of the first engaging portions 570 including the aforementioned recess portions of the light guide plate 57 are formed in the vicinity of central portions in the vertical direction on both sides in the horizontal direction (hereinafter referred to as the outer side) of the rear frame 45. As shown in FIG. 11, the side end surfaces 57c and 57d of the light guide plate 57 are perpendicular to the mounting surface 52a of the glass epoxy board 52. These side end surfaces 57c and 57d of the light guide plate 57 are examples of the "second end surface" in the present invention.

The shapes of a first engaging portion 570 of the light guide plate 57 and a second engaging portion 450 of the rear frame 45 are hereinafter described in detail. The first engaging portion 570 of the light guide plate 57 and the second engaging portion 450 of the rear frame 45 are so formed as to be substantially axisymmetric about a straight line 13 and a straight line m3 extending in the horizontal direction (direction X) through central portions of the first engaging portion 570 and the second engaging portion 450 in the vertical direction (direction Z), respectively, as shown in FIG. 10.

As shown in FIG. 10, a portion of the first engaging portion 570 of the light guide plate 57 on the upper side (along arrow Z1) with respect to the straight line 13 is formed in a shape including an inclined portion 571 inclined by the prescribed angle θ2 with respect to the mounting surface 52a of the glass epoxy board 52 in a direction (along arrow Z1) separating from the mounting surface 52a and a parallel portion 572 extending in a direction (direction X) parallel to the mounting surface 52a of the glass epoxy board 52. A set of the inclined portion 571 and the parallel portion 572 is provided on each side with respect to the straight line 13 of the first engaging portion 570. End portions of the parallel portions 572 on the outer side and end portions of the inclined portions 571 on the inner side are coupled with each other. The parallel portion 572 located on the upper side with respect to the straight line 13 and the parallel portion 572 located on the lower side with respect to the straight line 13 are coupled with each other through a coupling portion 573 extending vertically (in the direction Z). The parallel portion 572 is an example of the "second parallel portion" in the present invention.

Similarly, a portion of the second engaging portion 450 of the rear frame 45 on the upper side (along arrow Z1) with respect to the straight line m3 is formed in a shape including an inclined portion 451 inclined by the prescribed angle θ2 with respect to the mounting surface 52a of the glass epoxy board 52 in the direction (along arrow Z1) separating from the mounting surface 52a and a parallel portion 452 extending in the direction (direction X) parallel to the mounting surface 52a of the glass epoxy board 52. A set of the inclined portion 451 and the parallel portion 452 is provided on each side with respect to the straight line m3 of the second engaging portion 450. End portions of the parallel portions 452 on the outer side and end portions of the inclined portions 451 on the inner side are coupled with each other. The parallel portion 452 located on the upper side with respect to the straight line m3 and the parallel portion 452 located on the lower side with respect to the straight line m3 are coupled with each other through a coupling portion 453 extending vertically (in the direction Z). The parallel portion 452 is an example of the "second parallel portion" in the present invention.

According to the third embodiment, the inclination angles θ2 of the inclined portion 571 of the first engaging portion 570 of the light guide plate 57 and the inclined portion 451 of the second engaging portion 450 of the rear frame 45 with respect to the mounting surface 52a of the glass epoxy board 52 are preferably so set as to be equal to arctan (H2/L2), where L2 (see FIG. 11) denotes the length of the light-receiving surface 57a of the light guide plate 57 in a longitudinal direction (direction X) and H2 (see FIG. 11) denotes a distance from the light-receiving surface 57a to the lower end portion (end portion along arrow Z2) of each of the first engaging portions 570 formed on the side end surfaces 57c and 57d of the light guide plate 57.

The remaining structure of the liquid crystal television 300 according to the third embodiment is similar to that of the liquid crystal television 200 according to the aforementioned second embodiment.

Next, movement of the light guide plate 57 in the vertical direction (direction Z) at expansion or contraction of the light guide plate 57 according to the third embodiment is described with reference to FIG. 10.

In the state where the light guide plate 57 neither expands nor contracts (initial state (see FIG. 10 (a))), the light guide plate 57 is fixed onto the rear frame 45, whereby the light guide plate 57 does not move.

When the light guide plate 57 expands in this state, the inclined portion 571 of the first engaging portion 570 of the light guide plate 57 moves upward (along arrow Z1) along the inclined portion 451 of the second engaging portion 450 of the rear frame 45 so that the light guide plate 57 moves upward by a prescribed distance (D5 or D6), as shown in FIG. 10. Then, the light guide plate 57 (first engaging portion 570) stops when the light guide plate 57 maximally expands (at maximum expansion (see FIG. 10 (c)).

Similarly, when the light guide plate 57 contracts in the state where the light guide plate 57 maximally expands (at maximum expansion (see FIG. 10 (c)), the inclined portion 571 of the first engaging portion 570 of the light guide plate 57 moves downward (along arrow Z2) along the inclined portion 451 of the second engaging portion 450 of the rear frame 45 so that the light guide plate 57 moves downward by the prescribed distance (D6 or D5), as shown in FIG. 10. Then, the light guide plate 57 (first engaging portion 570) stops when the light guide plate 57 maximally contracts (initial state (see FIG. 10 (a))).

As described above, the first engaging portion 570 of the light guide plate 57 moves in the direction (along arrow Z1) separating from the mounting surface 52a of the glass epoxy board 52 in response to the expansion of the light guide plate 57 when the light guide plate 57 expands. The first engaging portion 570 of the light guide plate 57 moves in a direction (along arrow Z2) approaching the mounting surface 52a of the glass epoxy board 52 in response to the contraction of the light guide plate 57 when the light guide plate 57 contracts. Thus, the light guide plate 57 (first engaging portion 570) moves vertically (in the direction Z) in response to the expansion or contraction of the light guide plate 57 even when the clearance S3 (see FIGS. 3 and 11) between the light guide plate 57 and the LEDs 51 is changed by the expansion or contraction of the light guide plate 57, and hence the change in the clearance S3 is cancelled.

According to the third embodiment, as hereinabove described, the parallel portions 572 and 452 extending in the direction (direction X) parallel to the mounting surface 52a of the glass epoxy board 52, engaging with each other and coming into contact with each other in the state where the light guide plate 57 neither expands nor contracts are provided on the first engaging portion 570 of the light guide plate 57 and the second engaging portion 450 of the rear frame 45, respectively. Thus, the light guide plate 57 can be stably held by the rear frame 45 with the parallel portions 572 and 452 extending in the direction (direction X) parallel to the mounting surface 52a of the glass epoxy board 52 that the first engaging portion 570 of the light guide plate 57 and the second engaging portion 450 of the rear frame 45 have in the state where the light guide plate 57 and the rear frame 45 are in contact with each other, when the light guide plate 57 neither expands nor contracts.

The remaining effects of the third embodiment are similar to those of the aforementioned second embodiment.

Although the present invention has been described and illustrated in detail, it is clearly understood that the same is by way of illustration and example only and is not to be taken by way of limitation, the spirit and scope of the present invention being limited only by the terms of the appended claims.

Figure 12:
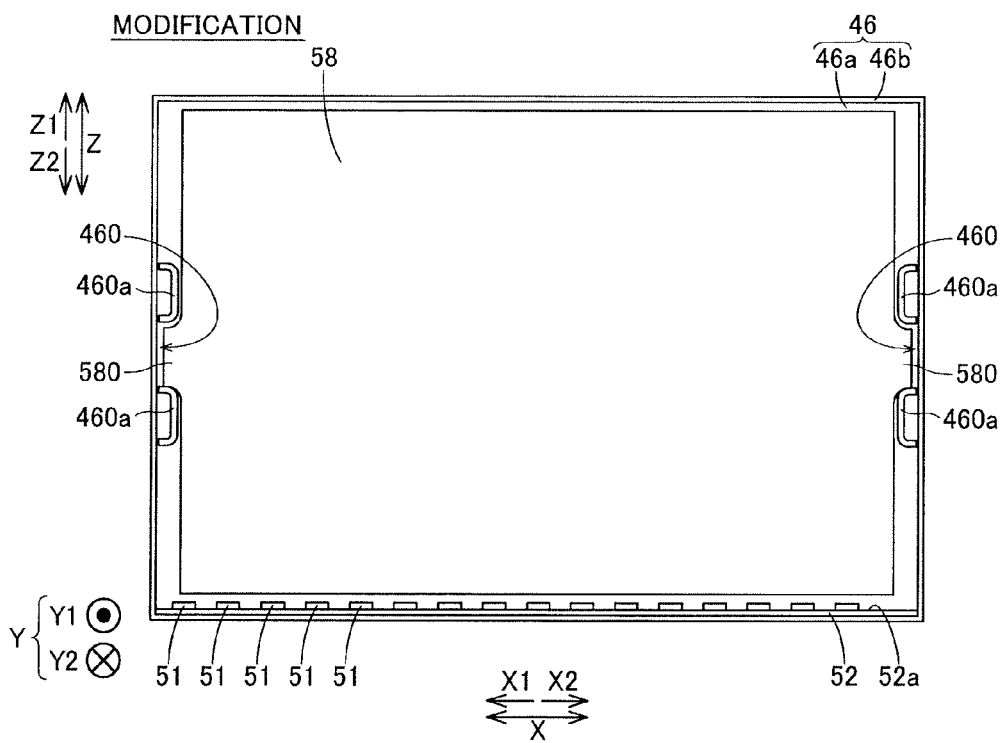
FIG. 12 is a plan view showing a light guide plate, a glass epoxy board, and LEDs held by a rear frame of a liquid crystal display module according to a modification of each of the first to third embodiments of the present invention.

For example, while the first engaging portions of the light guide plate include the recess portions while the second engaging portions of the rear frame include the projecting portions in each of the aforementioned first to third embodiments, the present invention is not restricted to this. In the present invention, alternatively, first engaging portions 580 of a light guide plate 58 may include projecting portions while second engaging portions 460 of a rear frame 46 may include recess portions, as in a modification shown in FIG. 12. In this modification, the first engaging portions 580 including the projecting portions protruding toward a wall portion 46b of the rear frame 46 are formed on both side end portions of the light guide plate 58 in a horizontal direction (direction X), as shown in FIG. 12. Furthermore, in this modification, two projecting portions 460a in shapes similar to the shapes of the second engaging portions 420 according to the aforementioned first embodiment are arranged in a vertical direction (direction Z) on each side in the horizontal direction (direction X) of a bottom portion 46a of the rear frame 46, and each of the first engaging portions 580 of the light guide plate 58 engages with each of the second engaging portions 460 including the recess portions each formed in a space between these two projecting portions 460a.

While both of the first engaging portions of the light guide plate and the second engaging portions of the rear frame are formed in the shapes allowing the first engaging portions of the light guide plate to move in the direction orthogonal to the mounting surface of the board in response to the expansion or contraction of the light guide plate when the light guide plate expands or contracts in each of the aforementioned first to third embodiments, the present invention is not restricted to this. In the present invention, either ones of the first engaging portions and the second engaging portions may alternatively have rectangular shapes, for example, so far as the other ones of the first engaging portions and the second engaging portions have the shapes allowing the first engaging portions of the light guide plate to move in the direction orthogonal to the mounting surface of the board in response to the expansion or contraction of the light guide plate when the light guide plate expands or contracts.

While the portions in the shapes allowing the first engaging portions to move upward or downward in response to the expansion or contraction of the light guide plate when the light guide plate expands or contracts are provided on not only portions of the first engaging portions of the light guide plate and the second engaging portions of the rear frame coming into contact with each other due to the weight of the light guide plate when the first engaging portions and the second engaging portions engage with each other but also other portions thereof (for example, the arcuate portions 532 and 422 are provided on not only portions of the first engaging portions 530 and the second engaging portions 420 on the upper side (along arrow Z1) with respect to the straight lines l1 and m1 (see FIG. 6), respectively but also portions thereof on the lower side (along arrow Z2) with respect to the straight lines l1 and m1 in the first embodiment) in each of the aforementioned first to third embodiments, the present invention is not restricted to this. In the present invention, the portions in the shapes allowing the first engaging portions to move upward or downward in response to the expansion or contraction of the light guide plate when the light guide plate expands or contracts may alternatively be provided on only the portions of the first engaging portions of the light guide plate and the second engaging portions of the rear frame coming into contact with each other due to the weight of the light guide plate when the first engaging portions and the second engaging portions engage with each other.

While the first engaging portions are formed in the vicinity of the central portions in the vertical direction of both side end portions in the horizontal direction of the light guide plate while the second engaging portions are formed in the vicinity of the central portions in the vertical direction on both sides in the horizontal direction of the rear frame in each of the aforementioned first to third embodiments, the present invention is not restricted to this. In the present invention, alternatively, the first engaging portions may be formed in the vicinity of upper end portions or lower end portions of both side end portions in the horizontal direction of the light guide plate while the second engaging portions may be formed in the vicinity of upper end portions or lower end portions on both sides in the horizontal direction of the rear frame.

While the first engaging portions and the second engaging portions are integrally formed on the light guide plate and the rear frame, respectively, in each of the aforementioned first to third embodiments, the present invention is not restricted to this. In the present invention, the light guide plate and the rear frame may alternatively be engaged with each other by first engaging portions and second engaging portions provided separately from the light guide plate and the rear frame.

While the present invention is applied to the liquid crystal television as an example of the display device in each of the aforementioned first to third embodiments, the present invention is not restricted to this. The present invention is also applicable to another display device such as a monitor of a PC (personal computer).

What is claimed is:

1. A display device comprising:
a display module; and
a housing storing said display module inside, wherein said display module includes:
a display cell,
a board having a mounting surface mounted with a light source,
a light guide plate formed with a first engaging portion, guiding light received from said light source to said display cell, and
a holding member formed with a second engaging portion coming into contact with said first engaging portion of said light guide plate to engage with said first engaging portion, holding said board and said light guide plate, and
at least either said first engaging portion of said light guide plate or said second engaging portion of said holding member is formed in a shape allowing said first engaging portion of said light guide plate to move in a direction orthogonal to said mounting surface of said board in response to expansion or contraction of said light guide plate when said light guide plate expands or contracts; and
wherein at least either said first engaging portion of said light guide plate or said second engaging portion of said holding member is formed in a shape allowing a light-receiving surface of said light guide plate to move in a direction separating from said mounting surface of said board in response to said expansion of said light guide plate when said light guide plate expands and allowing the light-receiving surface of said light guide plate to move in a direction approaching said mounting surface of said board in response to said contraction of said light guide plate when said light guide plate contracts.

2. The display device according to claim 1, wherein said first engaging portion includes either one of a recess portion and a projecting portion, and
said second engaging portion includes the other one of said recess portion and said projecting portion coming into contact with said first engaging portion to engage with said first engaging portion.

3. The display device according to claim 1, wherein at least either said first engaging portion of said light guide plate or said second engaging portion of said holding member is formed in a shape allowing said first engaging portion of said light guide plate to move in a direction separating from said mounting surface of said board in response to said expansion of said light guide plate when said light guide plate expands and allowing said first engaging portion of said light guide plate to move in a direction approaching said mounting surface of said board in response to said contraction of said light guide plate when said light guide plate contracts.

4. The display device according to claim 1, wherein said light guide plate is arranged above said mounting surface of said board, and
at least one of a portion of said first engaging portion of said light guide plate and a portion of said second engaging portion of said holding member, coming into contact with each other due to a weight of said light guide plate when said first engaging portion and said second engaging portion engage with each other includes a portion in a shape allowing said first engaging portion of said light guide plate to move upward or downward above said mounting surface of said board in response to said expansion or contraction of said light guide plate when said light guide plate expands or contracts.

5. The display device according to claim 1, wherein said first engaging portion of said light guide plate and said second engaging portion of said holding member include arcuate portions engaging with each other and coming into contact with each other in a state where said light guide plate expands or contracts, and
a radius of curvature of said arcuate portion of said first engaging portion of said light guide plate is larger than a radius of curvature of said arcuate portion of said second engaging portion of said holding member.

6. The display device according to claim 5, wherein said first engaging portion of said light guide plate and said second engaging portion of said holding member further include first parallel portions extending in a direction parallel to said mounting surface of said board, engaging with each other and coming into contact with each other in a state where said light guide plate neither expands nor contracts in addition to said arcuate portions.

7. The display device according to claim 1, wherein at least either one of said first engaging portion and said second engaging portion includes an inclined portion inclined by a prescribed angle θ with respect to said mounting surface of said board in a direction separating from said mounting surface, engaging with the other one of said first engaging portion and said second engaging portion and coming into contact with the other one of said first engaging portion and said second engaging portion in a state where said light guide plate expands or contracts.

8. The display device according to claim 7, wherein said first engaging portion and said second engaging portion further include second parallel portions extending in a direction parallel to said mounting surface of said board, engaging with each other and coming into contact with each other in a state where said light guide plate neither expands nor contracts.

9. The display device according to claim 7, wherein
said light guide plate includes a first end surface parallel to said mounting surface of said board and a second end surface formed with said first engaging portion, perpendicular to said mounting surface of said board, and
said prescribed angle θ is so set as to be equal to arctan (H/L), where L denotes a length of said first end surface of said light guide plate in a longitudinal direction and H denotes a distance from said first end surface to said first engaging portion formed on said second end surface of said light guide plate.

10. The display device according to claim 1, wherein
each of said light guide plate and said holding member has a rectangular shape, and
said first engaging portion is formed on each of two sides of said light guide plate having a rectangular shape, extending in said direction orthogonal to said mounting surface of said board while said second engaging portion is formed on each of two sides of said holding member having a rectangular shape, extending in said direction orthogonal to said mounting surface of said board.

11. The display device according to claim 1, wherein
both of said first engaging portion of said light guide plate and said second engaging portion of said holding member are formed in the vicinity of said light source.

12. The display device according to claim 11, wherein
said first engaging portion of said light guide plate is formed in the vicinity of lower end portions of both side end portions in a horizontal direction of said light guide plate and formed in the vicinity of said light source, and
said second engaging portion of said holding member is formed in the vicinity of lower end portions of both side end portions in the horizontal direction of said holding member and formed in the vicinity of said light source.

* * * * *